United States Patent
Mori et al.

(10) Patent No.: US 9,600,677 B2
(45) Date of Patent: Mar. 21, 2017

(54) DATABASE APPARATUS, METHOD, AND PROGRAM

(71) Applicants: Kengo Mori, Minato-ku (JP); Satoshi Obana, Minato-ku (JP); Jun Furukawa, Minato-ku (JP); Isamu Teranishi, Minato-ku (JP); Toshiyuki Isshiki, Minato-ku (JP); Toshinori Araki, Minato-ku (JP)

(72) Inventors: Kengo Mori, Minato-ku (JP); Satoshi Obana, Minato-ku (JP); Jun Furukawa, Minato-ku (JP); Isamu Teranishi, Minato-ku (JP); Toshiyuki Isshiki, Minato-ku (JP); Toshinori Araki, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 14/357,478

(22) PCT Filed: Nov. 9, 2012

(86) PCT No.: PCT/JP2012/079126
§ 371 (c)(1),
(2) Date: May 9, 2014

(87) PCT Pub. No.: WO2013/069770
PCT Pub. Date: May 16, 2013

(65) Prior Publication Data
US 2014/0325217 A1    Oct. 30, 2014

(30) Foreign Application Priority Data

Nov. 11, 2011 (JP) ................................ 2011-247909

(51) Int. Cl.
G06F 21/62 (2013.01)
G06F 17/30 (2006.01)
H04L 9/00 (2006.01)

(52) U.S. Cl.
CPC ........ *G06F 21/62* (2013.01); *G06F 17/30289* (2013.01); *G06F 21/6227* (2013.01); *H04L 9/008* (2013.01); *G06F 2221/2107* (2013.01)

(58) Field of Classification Search
None
See application file for complete search history.

(56) References Cited

U.S. PATENT DOCUMENTS 6,792,425 B2    9/2004  Yagawa et al.
7,111,005 B1 *  9/2006  Wessman .............. G06F 21/604
(Continued)

FOREIGN PATENT DOCUMENTS

JP    2002-169808 A    6/2002
JP    2004-234344 A    8/2004
(Continued)

OTHER PUBLICATIONS

Craig Gentry, "Fully Homomorphic Encryption Using Ideal Lattices", STOC, May 31-Jun. 2, 2009, pp. 169-178.
(Continued)

*Primary Examiner* — Benjamin Lanier
(74) *Attorney, Agent, or Firm* — Sughrue Mion, PLLC

(57) ABSTRACT

Provided a database apparatus comprising a control means to execute data access control on a database, wherein the control means, receiving a database operation command from a user apparatus, comprises, regarding data and/or metadata to be handled associated with the database operation command, means for executing database operation or computation on encrypted data and/or encrypted metadata as is in ciphertext and means for executing database operation
(Continued)

or computation on plaintext data and/or plaintext metadata, and the control means sends a processing result to the user apparatus.

21 Claims, 28 Drawing Sheets

(56) References Cited

U.S. PATENT DOCUMENTS

| | | | |
|---|---|---|---|
| 8,171,307 B1* | 5/2012 | Chang | 713/189 |
| 8,949,603 B2* | 2/2015 | Moon | 713/168 |
| 2002/0065956 A1* | 5/2002 | Yagawa et al. | 709/330 |
| 2004/0243799 A1 | 12/2004 | Hacigumus et al. | |
| 2004/0243816 A1 | 12/2004 | Hacigumus et al. | |
| 2004/0260921 A1* | 12/2004 | Treadwell | 713/150 |
| 2005/0027680 A1 | 2/2005 | Yagawa et al. | |
| 2005/0147246 A1 | 7/2005 | Agrawal et al. | |
| 2006/0005017 A1* | 1/2006 | Black et al. | 713/165 |
| 2009/0232315 A1* | 9/2009 | Bandaram et al. | 380/282 |
| 2010/0142710 A1* | 6/2010 | Chrysler et al. | 380/277 |
| 2010/0146299 A1* | 6/2010 | Swaminathan et al. | 713/189 |
| 2011/0142230 A1* | 6/2011 | Zuili | G06F 21/602 |
| | | | 380/28 |

FOREIGN PATENT DOCUMENTS

| | | |
|---|---|---|
| JP | 2004-528615 A | 9/2004 |
| JP | 2005-134990 A | 5/2005 |
| WO | 02/29577 A2 | 4/2002 |

OTHER PUBLICATIONS

International Search Report for PCT/JP2012/079126 dated Jan. 8, 2013.
Communication dated Mar. 23, 2015 from the European Patent Office in counterpart application No. 12848480.5.
Hakan Hacigumus, Executing SQL over Encrypted Data in the Database-Service-Provider Model, Proceedings of the ACM Sigmod International Conference on Management of Data, Jun. 1, 2002, pp. 216-227, New York, US.

* cited by examiner

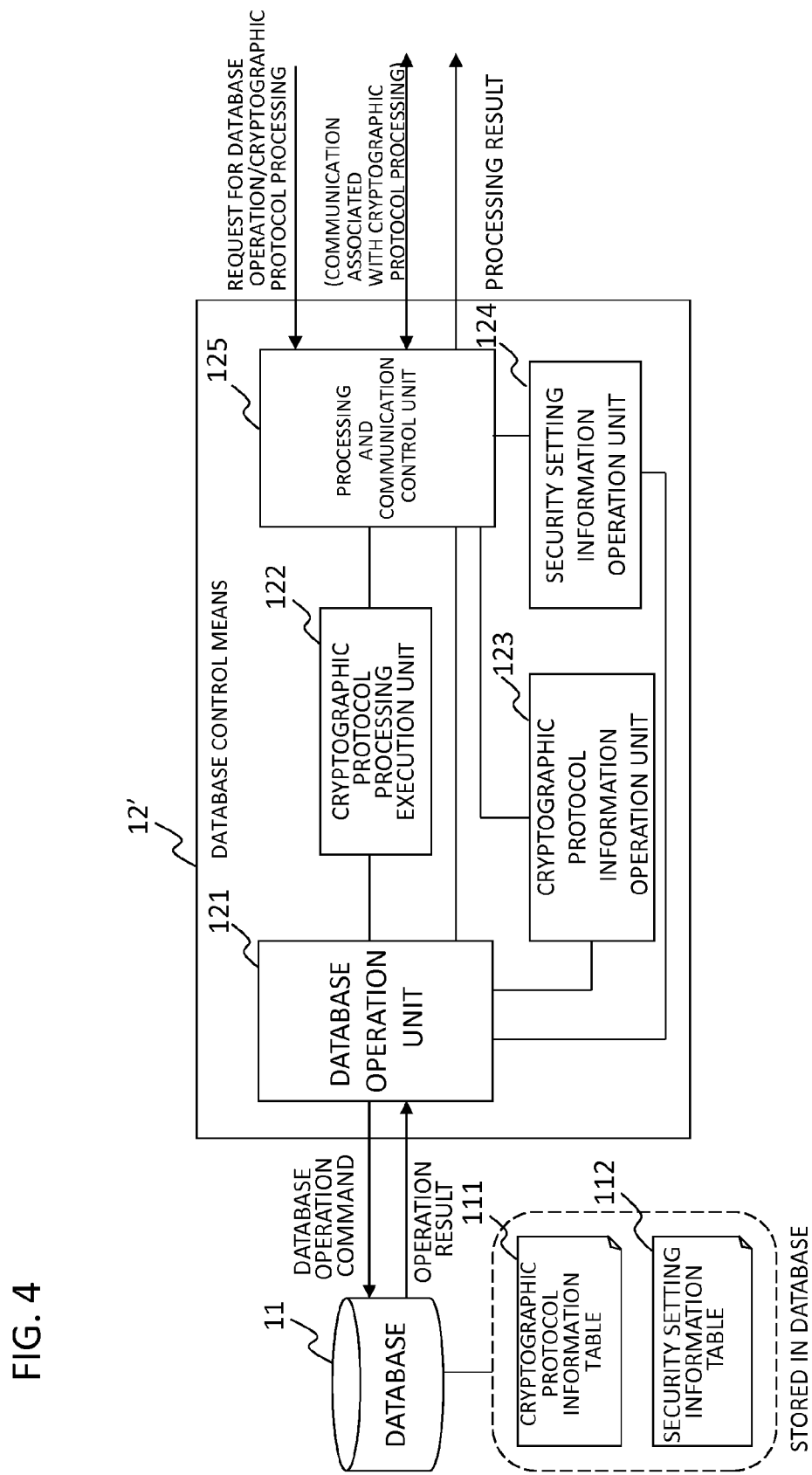

FIG. 5

| PROCESSING CONTENT IDENTIFIER | CONFIDENTIALITY | ENCRYPTION ALGORITHM IDENTIFIER | CRYPTOGRAPHIC PROTOCOL IDENTIFIER |
|---|---|---|---|
| SIMPLE-SEARCH | HIGH | AES | AES_SS_H |
| SIMPLE-SEARCH | HIGH | HE1 | HE1_SS_H |
| SIMPLE-SEARCH | MIDDLE | SE1 | SE1_SS_M |
| SIMPLE-SEARCH | MIDDLE | AES | AES_SS_M |
| SIMPLE-SEARCH | MIDDLE | HE1 | HE1_SS_M |
| SIMPLE-SEARCH | LOW | SE1 | SE1_SS_L |
| SIMPLE-SEARCH | LOW | AES | AES_SS_L |
| .. | .. | .. | .. |
| ADDITION | HIGH | AES | AES_ADD_H |
| ADDITION | HIGH | HE1 | AHE1_SS_H |
| .. | .. | .. | .. |

FIG. 6

| TABLE NAME | ENCRYPTION OF TABLE NAME | COLUMN NAME | ENCRYPTION OF COLUMN NAME | ENCRYPTION OF COLUMN DATA | CONFIDENTIALITY OF COLUMN DATA | COLUMN DATA ENCRYPTION ALGORITHM IDENTIFIER |
|---|---|---|---|---|---|---|
| EMPLOYEE TABLE | NULL | WORK LOCATION | NULL | APPLIED | MIDDLE | SE1 |
| EMPLOYEE TABLE | NULL | WORK LOCATION | NULL | APPLIED | MIDDLE | AES |
| EMPLOYEE TABLE | NULL | 0xa638·· | APPLIED | APPLIED | HIGH | AES |
| 0x30c8a4·· | APPLIED | NULL | NULL | NULL | NULL | NULL |
| △☐TABLE | NULL | 0xc4b1·· | APPLIED | NULL | NULL | NULL |
| ·· | ·· | ·· | ·· | ·· | ·· | ·· |

FIG. 7A

EMPLOYEE TABLE (BEFORE ENCRYPTION)

| ... | WORK LOCATION | POSITION |
|---|---|---|
| : | HEADQUARTERS | SECTION CHIEF |
| : | TAMAGAWA | CHIEF |
| : | : | : |

FIG. 7B

CHPHERTEXT TABLE INFORMATION TABLE

| TABLE NAME | COLUMN NAME | ENCRYPTION ALGORITHM | PARAMETER | CHPHERTEXT TABLE NAME |
|---|---|---|---|---|
| EMPLOYEE TABLE | WORK LOCATION | AES | NULL | CHPHERTEXT_AES_1 |
| EMPLOYEE TABLE | WORK LOCATION | SE1 | 0x16a···· | CHPHERTEXT_SE1_1 |
| EMPLOYEE TABLE | 0xa638···· | AES | NULL | CHPHERTEXT_AES_2 |
| : | : | : | : | : |

FIG. 7C

EMPLOYEE TABLE (AFTER ENCRYPTION)

| ... | 0xa638···· | WORK LOCATION |
|---|---|---|
| : | : | 1 |
| : | : | 2 |
| : | : | : |

FIG. 7D

CHPHERTEXT_AES_1 TABLE

| ID | CHPHERTEXT |
|---|---|
| 1 | 0x3d8···· |
| 2 | 0x962···· |
| : | : |

FIG. 7E

CHPHERTEXT_AES_2 TABLE

| ID | CHPHERTEXT |
|---|---|
| 1 | 0x61b···· |
| 2 | 0xa53···· |
| : | : |

FIG. 7F

CHPHERTEXT_SE_1 TABLE

| ID | CHPHERTEXT |
|---|---|
| 1 | 0x8ec···· |
| 2 | 0x7c0···· |
| : | : |

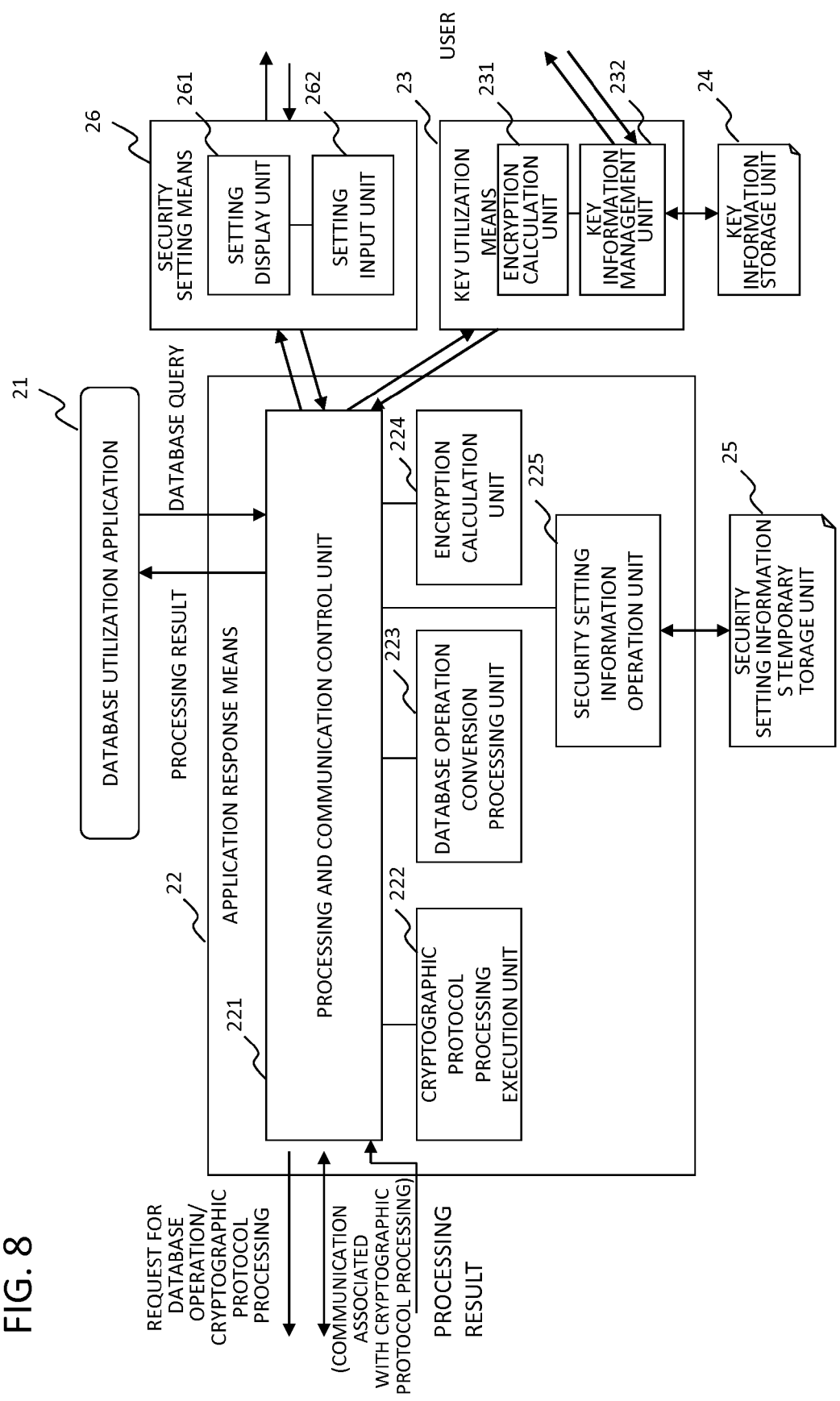

FIG. 9

| TABLE NAME | ENCRYPTION OF TABLE NAME | DECRYPTED TABLE NAME | COLUMN NAME | ENCRYPTION OF COLUMN NAME | DECRYPTED COLUMN NAME | ENCRYPTION OF COLUMN DATA | CONFIDENTIALITY OF COLUMN DATA | COLUMN DATA ENCRYPTION ALGORITHM IDENTIFIER |
|---|---|---|---|---|---|---|---|---|
| EMPLOYEE TABLE | NULL | NULL | WORK LOCATION | NULL | NULL | APPLIED | MIDDLE | SE1 |
| EMPLOYEE TABLE | NULL | NULL | WORK LOCATION | NULL | NULL | APPLIED | MIDDLE | AES |
| EMPLOYEE TABLE | NULL | NULL | 0xa638··· | APPLIED | POSITION | APPLIED | HIGH | AES |
| 0x30c8a4··· | APPLIED | ××TABLE | NULL | NULL | ● × | NULL | NULL | NULL |
| △☐TABLE | NULL | NULL | 0xc4b1··· | APPLIED | ● × | NULL | NULL | NULL |
| ·· | ·· | ·· | ·· | ·· | ·· | ·· | ·· | ·· |

FIG. 10

| ENCRYPTION ALGORITHM IDENTIFIER | KEY INFORMATION |
|---|---|
| AES | 0x51a4··· |
| HE1 | 0xb316··· |
| SE1 | 0x506c··· |
| ·· | ·· |

FIG. 17

| PROCESSING CONTENT IDENTIFIER | CONFIDEN-TIALITY | ENCRYPTION ALGORITHM IDENTIFIER | CRYPTOGRAPHIC PROTOCOL IDENTIFIER |
|---|---|---|---|
| SIMPLE-SEARCH | HIGH | AES | AES_SS_H |
| SIMPLE-SEARCH | HIGH | HE1 | HE1_SS_H |
| SIMPLE-SEARCH | MIDDLE | SE1 | SE1_SS_M |
| SIMPLE-SEARCH | MIDDLE | AES | AES_SS_M |
| SIMPLE-SEARCH | MIDDLE | HE1 | HE1_SS_M |
| SIMPLE-SEARCH | LOW | SE1 | SE1_SS_L |
| SIMPLE-SEARCH | LOW | AES | AES_SS_L |
| .. | .. | .. | .. |
| ADDITION | HIGH | AES | AES_ADD_H |
| ADDITION | HIGH | HE1 | HE1_ADD_H |
| .. | .. | .. | .. |

CRYPTOGRAPHIC PROTOCOL INFORMATION STORAGE UNIT

FIG. 18

| TABLE NAME | ENCRYPTION OF TABLE NAME | COLUMN NAME | ENCRYPTION OF COLUMN NAME | ENCRYPTION OF COLUMN DATA | CONFIDENTIALITY OF COLUMN DATA | COLUMN DATA ENCRYPTION ALGORITHM IDENTIFIER |
|---|---|---|---|---|---|---|
| EMPLOYEE TABLE | NULL | ‥ | ‥ | ‥ | ‥ | ‥ |
| EMPLOYEE TABLE | NULL | WORK LOCATION | NULL | NULL TO APPLIED | NULL TO MIDDLE | NULL TO AES |
| EMPLOYEE TABLE | NULL | 0xa638‥ | APPLIED | APPLIED | HIGH | AES |
| 0x30c8a4‥ | APPLIED | NULL | NULL | NULL | NULL | NULL |
| △□ TABLE | NULL | 0xc4b1‥ | APPLIED | NULL | NULL | NULL |
| ‥ | ‥ | ‥ | ‥ | ‥ | ‥ | ‥ |

SECURITY SETTING INFORMATION STORAGE UNIT

FIG. 19

TEMPORARY SECURITY SETTING INFORMATION STORAGE UNIT

| TABLE NAME | ENCRYPTION OF TABLE NAME | DECRYPTED TABLE NAME | COLUMN NAME | ENCRYPTION OF COLUMN NAME | DECRYPTED COLUMN NAME | ENCRYPTION OF COLUMN DATA | CONFIDENTIALITY OF COLUMN DATA | COLUMN DATA ENCRYPTION ALGORITHM IDENTIFIER |
|---|---|---|---|---|---|---|---|---|
| EMPLOYEE TABLE | NULL | NULL | .. | .. | .. | .. | .. | .. |
| EMPLOYEE TABLE | NULL | NULL | WORK LOCATION | NULL | NULL | NULL TO APPLIED | NULL TO MIDDLE | NULL TO AES |
| EMPLOYEE TABLE | NULL | NULL | 0xa638... | APPLIED | POSITION | APPLIED | HIGH | AES |
| 0x30c8a4... | APPLIED | ××TABLE | NULL | NULL | NULL | NULL | NULL | NULL |
| △☐ TABLE | NULL | NULL | 0xc4b1... | APPLIED | ●× | NULL | NULL | NULL |
| .. | .. | .. | .. | .. | .. | .. | .. | .. |

FIG. 20B

LIST CREATED AFTER ENCRYPTION

| 8001 | HEADQUARTERS | 0x3d8... | 1 |
|---|---|---|---|
| 8002 | TAMAGAWA | 0x962... | 2 |
| .. | .. | .. | 3 |
| .. | .. | .. | .. |

FIG. 20A

EMPLOYEE TABLE

| EMPLOYEE NUMBER | ... | WORK LOCATION | POSITION |
|---|---|---|---|
| 8001 | .. | HEADQUARTERS | SECTION CHIEF |
| 8002 | .. | TAMAGAWA | CHIEF |
| .. | .. | .. | .. |

FIG. 21A

LIST CREATED AFTER ENCRYPTION

| 8001 | HEADQUARTERS | 0x3d8··· | 1 |
|------|--------------|----------|---|
| 8002 | TAMAGAWA | 0x962··· | 2 |
| .. | .. | .. | 3 |
| .. | .. | .. | .. |

FIG. 21B

CHPHERTEXT_AES_1 TABLE

| ID | CHPHERTEXT |
|----|------------|
| 1 | 0x3d8··· |
| 2 | 0x962··· |
| .. | .. |

FIG. 21C

CHPHERTEXT TABLE INFORMATION TABLE

| TABLE NAME | COLUMN NAME | ENCRYPTION ALGORITHM | PARAMETER | CHPHERTEXT TABLE NAME |
|------------|-------------|----------------------|-----------|------------------------|
| EMPLOYEE TABLE | WORK LOCATION | AES | NULL | CHPHERTEXT_AES_1 |
| .. | .. | .. | .. | .. |

FIG. 22A

LIST CREATED AFTER ENCRYPTION

| 8001 | HEADQUARTERS | 0x3d8··· | 1 |
| 8002 | TAMAGAWA | 0x962··· | 2 |
| ·· | ·· | ·· | 3 |
| ·· | ·· | ·· | ·· |

FIG. 22B

EMPLOYEE TABLE

| EMPLOYEE NUMBER | ··· | WORK LOCATION | POSITION |
|---|---|---|---|
| 8001 | : | 1 | SECTION CHIEF |
| 8002 | : | 2 | CHIEF |
| ·· | ·· | ·· | ·· |

FIG. 22C

CHPHERTEXT_AES_1 TABLE

| ID | CHPHERTEXT |
|---|---|
| 1 | 0x3d8··· |
| 2 | 0x962··· |
| ·· | ·· |

FIG. 22D

CHPHERTEXT TABLE INFORMATION TABLE

| TABLE NAME | COLUMN NAME | ENCRYPTION ALGORITHM | PARAMETER | CHPHERTEXT TABLE NAME |
|---|---|---|---|---|
| EMPLOYEE TABLE | WORK LOCATION | AES | NULL | CHPHERTEXT_AES_1 |
| ·· | ·· | ·· | ·· | ·· |

FIG. 23

| TABLE NAME | ENCRYPTION OF TABLE NAME | DECRYPTED TABLE NAME | COLUMN NAME | ENCRYPTION OF COLUMN NAME | DECRYPTED COLUMN NAME | ENCRYPTION OF COLUMN DATA | CONFIDENTIALITY OF COLUMN DATA | COLUMN DATA ENCRYPTION ALGORITHM IDENTIFIER |
|---|---|---|---|---|---|---|---|---|
| .. | .. | .. | .. | .. | .. | .. | .. | .. |
| WORKING HOURS MANAGEMENT TABLE | NULL | NULL | EMPLOYEE NUMBER | NULL | NULL | NULL | NULL | NULL |
| WORKING HOURS MANAGEMENT TABLE | NULL | NULL | WORKING HOURS | NULL | NULL | APPLIED | MIDDLE | AES |
| WORKING HOURS MANAGEMENT TABLE | NULL | NULL | OVERTIME HOURS | NULL | NULL | APPLIED | MIDDLE | AES |
| WORKING HOURS MANAGEMENT TABLE | NULL | NULL | OVERTIME HOURS | NULL | NULL | APPLIED | MIDDLE | HE1 |
| WORKING HOURS MANAGEMENT TABLE | NULL | NULL | DEPARTMENT NUMBER | NULL | NULL | NULL | NULL | NULL |
| .. | .. | .. | .. | .. | .. | .. | .. | .. |

FIG. 24A

WORKING HOURS MANAGEMENT TABLE

| EMPLOYEE NUMBER | WORKING HOURS | OVERTIME HOURS | DEPARTMENT NUMBER |
|---|---|---|---|
| 4001 | 1 | 1 | 10A |
| 4002 | 2 | 2 | 11B |
| 4003 | 3 | 3 | 10A |
| .. | .. | .. | .. |

FIG. 24B

CHPHERTEXT TABLE INFORMATION TABLE

| TABLE NAME | COLUMN NAME | ENCRYPTION ALGORITHM | PARAMETER | CHPHERTEXT TABLE NAME |
|---|---|---|---|---|
| WORKING HOURS MANAGEMENT TABLE | WORKING HOURS | AES | NULL | CHPHERTEXT_AES_1 |
| WORKING HOURS MANAGEMENT TABLE | OVERTIME HOURS | AES | NULL | CHPHERTEXT_AES_2 |
| WORKING HOURS MANAGEMENT TABLE | OVERTIME HOURS | HE1 | 0xc9e··· | CHPHERTEXT_HE1_1 |
| .. | .. | .. | .. | .. |

FIG. 24C

CHPHERTEXT_AES_1 TABLE

| ID | CHPHERTEXT |
|---|---|
| 1 | 0x3d8··· |
| 2 | 0x962··· |
| 3 | 0xec9··· |
| .. | .. |

FIG. 24D

CHPHERTEXT_AES_2 TABLE

| ID | CHPHERTEXT |
|---|---|
| 1 | 0xc50··· |
| 2 | 0x18e··· |
| 3 | 0x623··· |
| .. | .. |

FIG. 24E

CHPHERTEXT_HE1_1 TABLE

| ID | CHPHERTEXT |
|---|---|
| 1 | 0xead··· |
| 2 | 0x8e0··· |
| 3 | 0xabd··· |
| .. | .. |

FIG. 25

CRYPTOGRAPHIC PROTOCOL INFORMATION STORAGE UNIT

| PROCESSING CONTENT IDENTIFIER | CONFIDEN-TIALITY | ENCRYPTION ALGORITHM IDENTIFIER | CRYPTOGRAPHIC PROTOCOL IDENTIFIER |
|---|---|---|---|
| .. | .. | .. | .. |
| SIMPLE-SEARCH | MIDDLE | SE1 | SE1_SS_M |
| ADDITION | MIDDLE | HE1 | HE1_ADD_M |
| ADDITION | LOW | OPE1 | OPE1_ADD_M |
| AVERAGE | MIDDLE | HE1 | HE1_AVG_M |
| .. | .. | .. | .. |

DATABASE APPARATUS, METHOD, AND PROGRAM

This application is a National Stage of International Application No. PCT/JP2012/079126 filed Nov. 9, 2012, claiming priority based on Japanese Patent Application No. 2011-247909, filed Nov. 11, 2011, the contents of all of which are incorporated herein by reference in their entirety.

TECHNICAL FIELD

Reference to Related Application

The present invention is based upon and claims the benefit of the priority of Japanese patent application No. 2011-247909, filed on Nov. 11, 2011, the disclosure of which is incorporated herein in its entirety by reference thereto.

The present invention relates to a technique for encrypting information. In particular, it relates to a database apparatus, a method, and a program.

Background

Recently, there has been observed expanding utilization of cloud computing that provides infrastructures such as software, application, and OS (operating system) to clients via the Internet. Even with regard to a database, it is expected that there will be an increase in utilization mode in which the data base is outsourced to such a cloud environment.

In outsourcing a database to a cloud environment or the like, prevention of information leakage from the database is particularly important. To prevent information leakage from a database, various methods in which data to be recorded in a database is encrypted have been proposed. For example, these methods can be classified into the following techniques, though not limited thereto.

1. When data is stored in a database, the data is encrypted before stored. When data is retrieved, the data is decrypted and then sent to a user.

For example, Patent Literature 1 discloses a method and an apparatus for automatic database encryption. According to Patent Literature 1, encryption is automatically executed transparently to a database user, namely, unnoticed by the database user. Patent Literature 1 discloses a database system including a client, a database server, and a database. This system operates by receiving a request to store data in a column of the database system. When a user specifies a column of the database system as an encrypted column, the system automatically encrypts data by using an encryption function. This encryption function uses a key stored in a key file managed by a security administrator. After encrypting the data, the system stores the data by using a storage function of the database system. In addition, the system operates by receiving a request to retrieve data from an encrypted column of the database system. The system checks whether the column is encrypted by checking metadata of a column ID. When the column is encrypted, the system executes the following processing. Namely, when the request to retrieve data is made by an authorized user, the system retrieves an encryption parameter and a decryption key, decrypts the data, and sends the decrypted data to the client. However, when the request to retrieve data is made by an unauthorized user, the system does not decrypt the encrypted data. With this method and apparatus disclosed in Patent Literature 1, encryption and decryption keys are managed on the database side, and the user of the database system does not need to change any database queries.

2. The user side is allowed to manage a key, by using an encryption scheme that allows processing on encrypted data to be executed in the form of plaintext.

For example, Patent Literature 2 discloses an encryption database retrieval apparatus for speeding up retrieval processing. This apparatus executes index creation processing applicable to a retrieval system that retrieves a document stored in an encryption database without decrypting the document. The apparatus encrypts retrieval target data by using the same encryption scheme and key as those used for the encrypted data and retrieves the retrieval target data. With this system, even if there is information leakage from the database, only encrypted data is leaked.

In addition, for example, Patent Literature 3 discloses a database access system as a system in which the user side manages keys and a terminal on the user side encrypts and decrypts data that is stored in a database. The user terminal includes a secret key generation means for generating a secret key by using a public key, a storage means for storing the secret key, an encryption means for encrypting data on the basis of the public key, and a decryption means for decrypting the encrypted data by using the secret key. The database access system is configured to accurately prevent data leakage to the administrators and the like storing and managing data, as well as to third parties intruding from the outside.

3. Arbitrary processing is executed on ciphertext as in ciphertext.

Non-Patent Literature 1 discloses that an arbitrary logic computation can be executed on encrypted data by using fully homomorphic encryption, without decrypting the encrypted data.

CITATION LIST

Patent Literature

[Patent Literature 1]
Japanese Unexamined Patent Application Publication (Translation of PCT Application) No. 2004-528615 (International Publication No. 02/029577)
[Patent Literature 2]
Japanese Patent Kokai Publication No. 2005-134990A
[Patent Literature 3]
Japanese Patent Kokai Publication No. 2004-234344A Non Patent Literature

[Non-Patent Literature 1]
Craig Gentry, "Fully Homomorphic Encryption Using Ideal Lattices", STOC '09, pp. 169-178, May 31-Jun. 2, 2009

SUMMARY

Analyses of the above related techniques will be described below.

1. According to the technique in which, when data is stored in a database, the data is encrypted before stored, and when data is retrieved, the data is decrypted before sent to a user, the encryption and decryption keys are arranged on the database side. Thus, information could be leaked by such as intrusion to the database system from an outside or by a malicious operation, and an erroneous operation or the like by a database manager (a database administrator or the like).

2. The technique in which a user side is allowed to manage a key by using an encryption scheme that can process ciphertext is applicable only to a part (for example, search processing) of general database operations (SQL) (not applicable to database computation operations and so forth other than the search processing (reference access)).

3. The technique that enables processing on encrypted data as is in ciphertext by using fully homomorphic encryption requires an enormous amount of computation. For example, it is assumed that the computation quantity that is a trillion times the current computation quantity is necessary.

Accordingly, the present invention has been made in view of the above problems, and a primary object of the present invention is to provide a system, a method, and a program that can prevent leakage of confidential information in a database system and can improve processing efficiency.

According to the present invention, there is provided a database apparatus, including:

a control unit configured to execute data access control on a database, the control unit receiving a database operation command from a user apparatus, the control unit including, regarding data and/or metadata to be handled associated with the database operation command, a unit configured to execute database operation or computation on encrypted data and/or encrypted metadata as is in ciphertext; and a unit configured to execute database operation or computation on plaintext data and/or plaintext metadata, the control unit sending a processing result to the user apparatus.

According to another aspect of the present invention, there is provided a database control method, including:

receiving a database operation command from a user apparatus;

executing, regarding data and/or metadata to be handled associated with the database operation command, at least one of database operation or computation on encrypted data and/or encrypted metadata as is in ciphertext, and database operation or computation on plaintext data and/or plaintext metadata, regarding data and/or metadata to be handled associated with the database operation command; and sending a processing result to the user apparatus.

According to still another aspect of the present invention, there is provided a non-transitory computer readable medium storing a program, causing a computer included in a database control apparatus that is connected to a user apparatus for communication and that executes data access control on a database to execute processing comprising:

receiving a database operation command from the user apparatus;

executing, regarding data and/or metadata to be handled associated with the database operation command, at least one of database operation or computation on encrypted data and/or encrypted metadata as is in ciphertext, and database operation or computation on plaintext data and/or metadata, regarding data and/or metadata to be handled associated with the database operation command; and sending a processing result of the database operation to the user apparatus.

According to the present invention, leakage of information in a database system can be prevented and processing efficiency can be improved.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 illustrates another configuration of the database control means according to the exemplary embodiment of the present invention.

FIG. 5 illustrates a cryptographic protocol information storage unit according to the exemplary embodiment of the present invention.

FIG. 6 illustrates a security setting information storage unit according to the exemplary embodiment of the present invention.

FIGS. 7A, 7B, 7C, 7D, 7E and 7F illustrate ciphertext tables according to the exemplary embodiment of the present invention. FIG. 7A illustrates a table before encryption, FIG. 7B illustrates a ciphertext table information table, FIG. 7C illustrates a table after encryption, and FIGS. 7D to 7F illustrate ciphertext tables.

FIG. 8 illustrates a configuration of an application response means according to the exemplary embodiment of the present invention.

FIG. 9 illustrates a security setting information temporary storage unit according to the exemplary embodiment of the present invention.

FIG. 10 illustrates a key information storage unit according to the exemplary embodiment of the present invention.

FIG. 17 illustrates the cryptographic protocol information storage unit according to the exemplary embodiment of the present invention.

FIG. 18 illustrates the security setting information storage unit according to the exemplary embodiment of the present invention.

FIG. 19 illustrates the security setting information temporary storage unit according to the exemplary embodiment of the present invention.

FIGS. 20A and 20B illustrate encryption of column data according to the exemplary embodiment of the present invention.

FIGS. 21A, 21B and 21C illustrate processing for setting a data confidentiality level according to the exemplary embodiment of the present invention.

FIGS. 22A, 22B, 22C and 22D illustrate processing for setting a data confidentiality level according to the exemplary embodiment of the present invention.

FIG. 23 illustrates data operation processing according to the exemplary embodiment of the present invention.

FIGS. 24A, 24B, 24C, 24D and 24E illustrate data operation processing according to the exemplary embodiment of the present invention.

FIG. 25 illustrates data operation processing (the cryptographic protocol information storage unit) according to the exemplary embodiment of the present invention.

PREFERRED MODES

Figure 1:
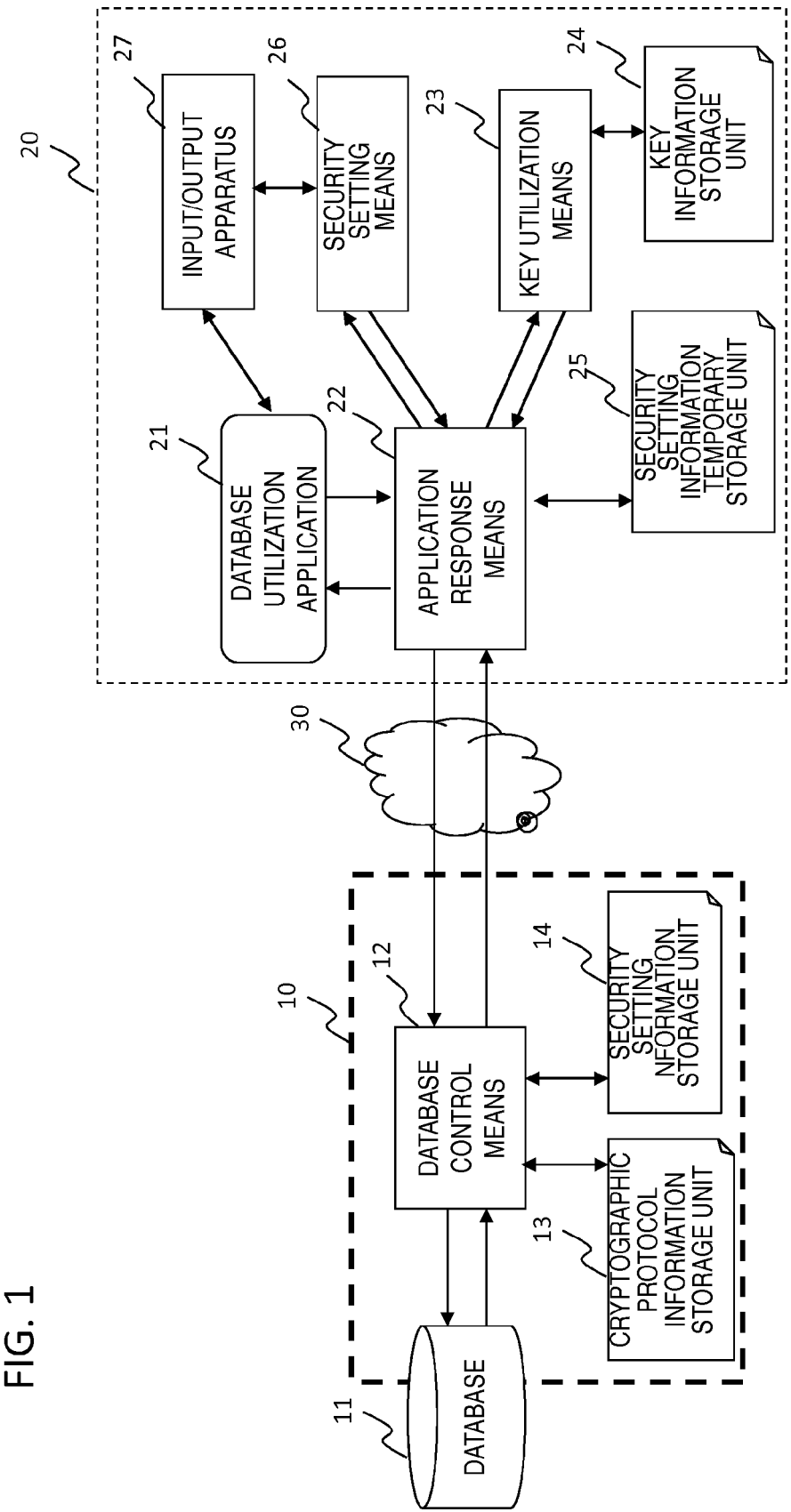
FIG. 1 illustrates a system configuration according to an exemplary embodiment of the present invention.

First, an outline of the present invention will be described, and next, exemplary embodiments will be described. According to an exemplary embodiment of the present invention, a database apparatus (for example, a database system 10 in FIG. 1) includes a control unit (for example, a database control means 12 in FIG. 1) configured to execute data access control on a database (for example, 11 in FIG. 1). The database control means (12) receives a database operation command from a user apparatus (20 in FIG. 1). The database control means (12) includes a unit (for example, 122 in FIG. 3) configured to execute cryptographic protocol processing on the database and a unit configured to execute a database operation on plaintext data, and sends a processing result to the user apparatus (20). Based on a database operation command, the user apparatus (20) selects whether or not to encrypt data to be stored in the database (11). As data corresponding to the database operation command, the user apparatus (20) sends data encrypted by an encryption algorithm corresponding to security of the data or plaintext data to the database apparatus (10).

According to an exemplary embodiment of the present invention, the database apparatus (10) receives a database operation command from the user apparatus (20). In the case wherein such a condition is met that the operation target data encrypted and stored in the database (11) is encrypted by an encryption algorithm allowing operation or computation on encrypted data to be executed as is in ciphertext, and that the operation or computation of the database operation command is operation or computation allowed to be executed on ciphertext as is in ciphertext, the control means performs operation or computation on the operation target data encrypted, as in ciphertext, and sends the result processed in ciphertext to the user apparatus (20).

According to an exemplary embodiment of the present invention, the following configuration is possible. Namely, the control means (12) in the database apparatus (10) sends a computation result of partial computation of a computation of the database operation command to the user apparatus (20) in ciphertext. Regarding the computation, if the user apparatus (20) finds that further partial computation needs to be executed in plaintext, the user apparatus (20) executes the partial computation on data obtained by decrypting the encrypted data into plaintext. If the computation still includes partial computation on encrypted data and if the partial computation on ciphertext is allowed, the user apparatus (20) sends encrypted data obtained by encrypting the result of the partial computation in plaintext to the control means (12). By using the encrypted data sent from the user apparatus (20), the control means (12) executes the remaining partial computation of the computation of the database operation command on the encrypted data and sends the computation result of the partial computation in ciphertext to the user apparatus (20).

According to an exemplary embodiment of the present invention, the following configuration is possible. Namely, the database apparatus (10) includes: a storage unit (for example, 14 in FIG. 1) that stores information on whether or not metadata including table and column names stored in the database (11) is encrypted, information on whether or not data stored in the database is encrypted (11), confidentiality information representing extent of data security, and encryption algorithm identification information corresponding to the confidentiality information; and a second storage unit (for example, 13 in FIG. 1) that stores at least cryptographic protocol identification information associating processing content in the database (11), confidentiality information encryption algorithm with each other.

Figure 3:
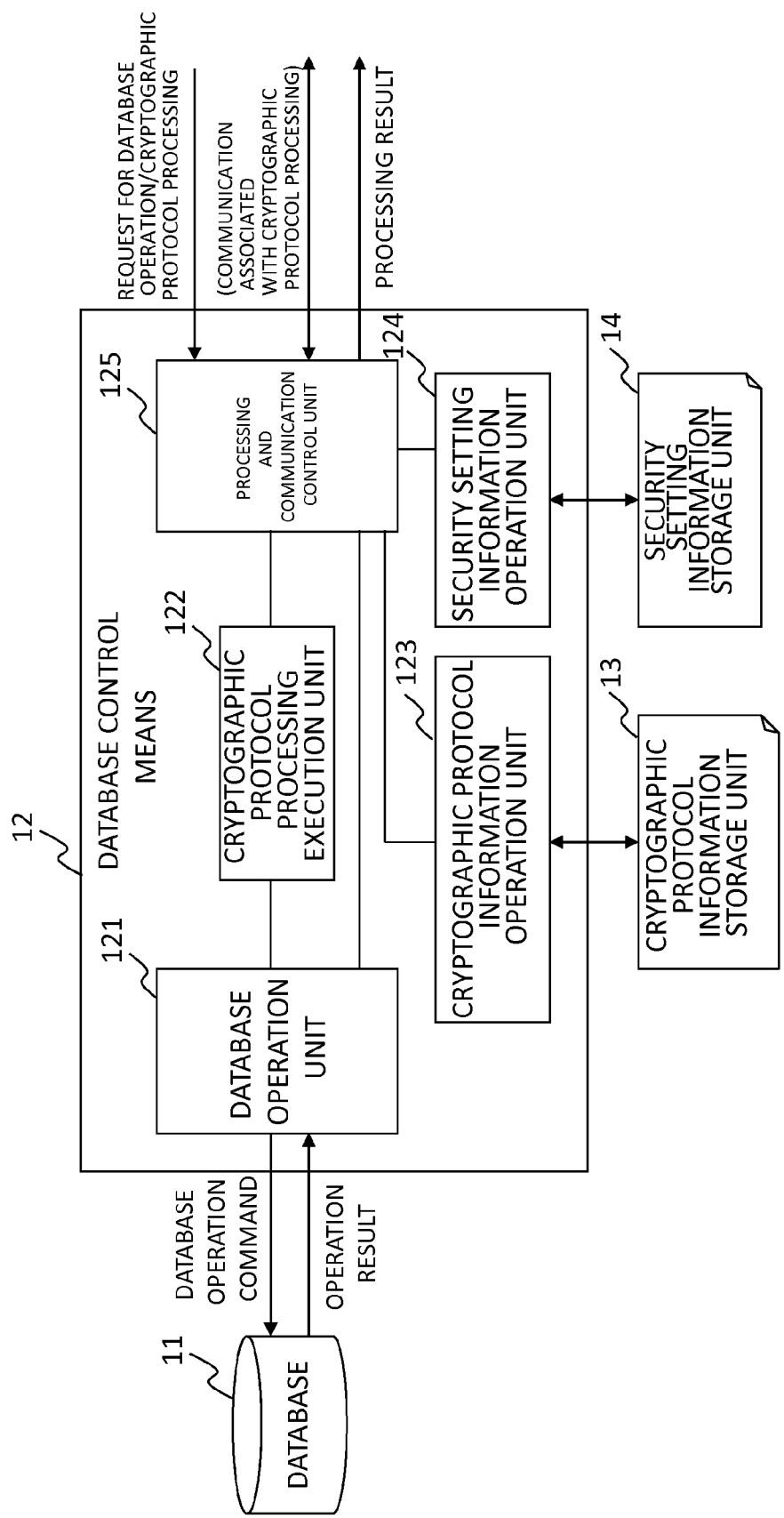
FIG. 3 illustrates a configuration of a database control means according to the exemplary embodiment of the present invention.

According to an exemplary embodiment of the present invention, the control means (12) in the database apparatus (10) may include a cryptographic protocol processing execution unit (122 in FIG. 3). The cryptographic protocol processing execution unit (122 in FIG. 3) may execute cryptographic protocol processing corresponding to processing content corresponding to the database operation command on data encrypted by an encryption algorithm corresponding to the confidentiality information, based on the cryptographic protocol identification information in the second storage unit.

According to an exemplary embodiment of the present invention, the control means (12) in the database apparatus (10) may include an encryption calculation unit (for example, 126 in FIG. 26) that encrypts metadata and/or data by using a public key sent from the user apparatus (20).

According to an exemplary embodiment of the present invention, when encrypting column data in a table in the database (11), the column data is read from the database (11), public key information is obtained from the user apparatus (20), the column data is encrypted by the encryption calculation unit (126), and a ciphertext table including a set of a serial number and ciphertext of the column data is created. To manage this ciphertext table, a ciphertext table information table including a set of a table name, a column name, an encryption algorithm, and a ciphertext table name may be provided.

The user apparatus (20) includes a key utilization means (for example, 23 in FIG. 1) configured to manage key information for data encryption and decryption, a security setting means (for example, 26 in FIG. 1) configured to set information about security setting of data stored in the database, a first storage unit (for example, 25 in FIG. 1) that stores information set by the security setting means (26), and an application response means (for example, 22 in FIG. 1).

The following configuration is possible. Namely, the application response means (22) receives a database operation command issued to the database system (10), refers to information in the first storage unit (25), and determines necessity of encryption of data and/or column data corresponding to the database operation command. When encryption is necessary, the application response means (22) obtains encrypted data and/or encrypted column data by performing encryption with key information (for example, a public key) managed by the key utilization means (23) by using an encryption algorithm corresponding to security of the data and/or column data. The application response means (22) sends the encrypted data and/or encrypted column data to the database control means (12) to execute a corresponding database operation. When encryption is not necessary, the application response means (22) sends the database operation command directly to the database control means (12) (sends plaintext, i.e., without encrypting the data) to execute a corresponding database operation. In addition, the following configuration is possible. Namely, when the user apparatus (20) receives a database processing result from the database control means (12), if conversion or decryption of the data and/or column data is necessary, the user apparatus (20) executes conversion or decryption using key information (for example, a secret key) managed by the key utilization means. As a response to the database operation command, the user apparatus (20) sends the obtained data to the source of the database operation command (for example, 21 in FIG. 1).

The security setting means (26) in the user apparatus (20) executes at least one of: setting or changing regarding whether or not metadata including table and column names in tables stored in the database (11) is encrypted; setting or changing regarding whether or not data stored in tables stored in the database (11) is encrypted; and setting or changing of confidentiality information representing extent of data security. The first storage unit (25) stores information regarding whether or not metadata including table and column names stored in the database is encrypted, information regarding whether or not data is encrypted, confidentiality information representing extent of data security, and encryption algorithm identification information corresponding to the confidentiality information.

According to the present invention, the user system (20), namely, a database user, manages key information used for data encryption and decryption and encrypts data/metadata. The user system (20) sends the encrypted data/metadata to the database system (10) and stores the data/metadata in the database (11).

In addition, database operations are executed transparently in a user-side database use application (21) that issues a database operation command (for example, SQL (Structured Query Language)). Namely, the application can execute a database operation by using a normal database operation command, without being conscious of data encryption. Thus, no change, modification, etc. for encryption needs to be made to the database utilization application (however, the present invention does not prohibit change, modification, etc. of the database utilization application).

<A. Prevention of Information Leakage>

Since the user system (10) includes a storage unit (24) storing key information for data encryption and decryption and the key utilization means (23) managing the key information, it is possible to prevent information leakage by intrusion to the database system from the outside or by a malicious operation, an erroneous operation and so forth by a database manager or the like.

<B. Efficient Processing>

Processing (an encryption algorithm) corresponding to a security (confidentiality) level required for data that is an operation target of a database operation command received from the database utilization application (21 in FIG. 1) is selected and executed. For example, for data for which a low security level is required, an encryption algorithm with a relatively high speed and a relatively low security level is used. In addition, by removing data, for which security (confidentiality) is not required, from an encryption target, efficient processing is made possible.

<C: Arbitrary Database Operations can be Executed>

In response to a database operation command supplied from the database utilization application (21 in FIG. 1), computation processing (addition, multiplication, or the like) is executed on encrypted data stored in the database in an encrypted state.

As is well known, for example, in additive homomorphic encryption such as the Paillier cryptosystem, if there are ciphertext $E(m1)$ of plaintext $m1$ and ciphertext $E(m2)$ of plaintext $m2$, $E(m1)+E(m2)=E(m1+m2)$ can be established as ciphertext $E(m1+m2)$ of $m1+m2$. Namely, the encrypted data of the sum $m1+m2$ of plaintext $m1$ and plaintext $m2$ can be obtained directly from the sum of the encrypted data of $m1$ and the encrypted data of $m2$. In addition, in multiplicative homomorphic encryption such as RSA encryption or Elgamall encryption, the encrypted data $E(m1 \times m2)$ of the product $m1 \times m2$ of plaintext $m1$ and plaintext $m2$ can be expressed as $E(m1 \times m2)=E(m1) \times E(m2)$. Namely, the encrypted data of the product of plaintext $m1$ and plaintext $m2$ can be obtained directly from the product of the encrypted data of plaintext $m1$ and the encrypted data of plaintext $m2$.

If the encryption algorithm corresponds to homomorphic encryption as described above, encrypted data can be added or multiplied, for example. However, for example, a complex computation including addition, subtraction, multiplication, and division or a logic computation cannot be executed. Thus, if a database operation command represents a computation that cannot be executed directly on encrypted data stored in the database, the encrypted data stored in the database is first read and sent to the user system, and the encrypted data is next decrypted in the user system into plaintext data. Next, computation processing is executed on the plaintext data and the computation result of the plaintext data is sent to the database utilization application that is an issueing source of the database operation command. Alternatively, if more complex processing is necessary, the following configuration is possible. Namely, the computation result of the plaintext data obtained after the encrypted data is decrypted into plaintext data and the computation processing is executed on the plaintext data on the user system side is encrypted again. The encrypted data is next sent to the database side, and the computation processing on the encrypted data is continuously executed on the database side. Namely, a plurality of processing including processing on encrypted data on the database side and processing on plaintext on the user system side may be combined and executed. In this way, by combining computation processing on encrypted data and on plaintext data, arbitrary database operations can be executed.

<D. Setting of Confidentiality>

On the user system side, encryption or non-encryption of information stored in the database can be set per table, column, and column data. In addition, a processing procedure (encryption algorithm) based on data operation content and required security (confidentiality degree) can be selected. In this way, processing efficiency can be improved.
<E. Elimination of Need for Modification of Application>

According to the present invention, for example, there is no need to change the syntax of database operation commands (SQL commands, etc.). The database use application (21 in FIG. 1) can issue database operation commands without making any change (all in plaintext for the syntax of command and table name, column name, data, and so forth specified in the command). If the database utilization application (21 in FIG. 1) issues a database operation command for creating a table, adding a column, adding a row, calculating data, or the like, the database operation command is supplied to the application response means (22 in FIG. 1) and an encryption algorithm corresponding to security of data is selected. After the data is encrypted by the encryption algorithm, the data is sent to the database system (10). In addition, by preparing the security setting means (26) to set the security of data to be stored in the database (11) separately from the database utilization application (21), the need for modification or the like of an existing application using the database is eliminated. Namely, according to the present invention, the application does not need to encrypt or decrypt data or set a security, for example. Thus, the present invention is applicable to an existing arbitrary application that issues a database operation command.

Patent Literature 3 discloses a database access system in which a terminal includes a secret key generation means for generating a secret key by using a public key, a storage means for storing the secret key, an encryption means for encrypting data on the basis of the public key, and a decryption means for decrypting the encrypted data using the secret key. In addition, Patent Literature 3 discloses that the database access system is configured to accurately prevent data leakage to the administrators and the like storing and managing data, as well as to third parties intruding from the outside. Namely, Patent Literature 3 realizes prevention of information leakage in the above item A. However, Patent Literature 3 does not disclose the above items B to E.

Exemplary Embodiments

The following describes exemplary embodiments with reference to the accompanying drawings.
<Example of System Configuration>

FIG. 1 illustrates an exemplary embodiment of the present invention. Referring to FIG. 1, a database system (database apparatus) 10 and a user system (user apparatus) 20 are connected to each other via a network 30 such as the Internet. The database system 10 includes a database 11, a database control means 12, a cryptographic protocol information storage unit 13, and a security setting information storage unit 14.

The user system 20 includes a database use application 21, an application response means 22, a key utilization means 23, a key information storage unit 24, a security setting information temporary storage unit 25, a security setting means 26, and an input/output apparatus 27. For example, the user system 20 is implemented on a data processing apparatus (CPU (Central Processing Unit), processor) having a function of communicating with the database system 10 by connecting to the network 30. In this case, the database utilization application 21 is an application program that operates on the data processing apparatus. The application response means 22, the key utilization means 23, and the security setting means 26 may also be realized as a program (a control program or the like) that operates on the data processing apparatus, though not limited thereto.

In FIG. 1, each of the means included in the user system 20 is arranged in a single block. However, these means may be configured as separate apparatuses via a communication network such as a local area network, for example. Likewise, in the database system 10, the database 11 and the database control means 12 are arranged in a single block. However, these means may of course be arranged separately. In addition, the application response means 22, the key utilization means 23, and the security setting means 26 may also be realized as a program (a control program or the like) that operates on the data processing apparatus, but not limited thereto. If the user system 20 is implemented on a thin-client system or the like, virtualization technology may be introduced to a server, and the user system may be implemented on a virtual machine on the server. In such case, a thin client terminal may input information to a database use application on the virtual machine on the server.

In addition, FIG. 1 illustrates only one user system 20 simply for ease of description. However, a plurality of user systems 20 may of course be connected to the database system 10 via the network 30. In addition, a plurality of user systems 20 may share a single application response means 22 that connects to and communicates with the database system 10. In such case, each of the plurality of user systems 20, i.e., each user, includes the key utilization means 23 and the key information storage unit 24. Namely, the user side stores and manages key information and includes a security setting means 26. Each user connects to the database system 10 via the shared application response means 22. An integrated security setting information temporary storage unit 25 may be consolidated in a single storage apparatus (system) for the plurality of user systems 20. Alternatively, a plurality of security setting information temporary storage units 25 may be arranged separately in a distributed manner for the respective user systems 20.
<Database System>

The following describes components in the database system 10. The database control means 12 includes means for executing an operation on the database 11 (a database operation based on a database operation command) and means for executing at least one cryptographic protocol.

For example, the security setting information storage unit 14 stores such information about an encryption algorithm used for encryption, as information for setting the security of data stored in the database 11. For example, the security setting information storage unit 14 stores information regarding whether or not metadata including table and column names stored in the database 11, information about information on whether or not data stored in the database is encrypted 11, confidentiality information representing extent of data security, and encryption algorithm identification information determining at least one encryption algorithm used when data encryption is executed.

The cryptographic protocol information storage unit 13 stores cryptographic protocol information for encrypting data in the database 11. For example, the cryptographic protocol information storage unit 13 stores processing content (simple-search, addition, etc.) for database operation command, encryption algorithm identification information corresponding to security (confidentiality) level required for data, and cryptographic protocol identification information. In the case of computation processing for adding encrypted data as is in ciphertext in the database 11, the cryptographic protocol information storage unit 13 stores information for selecting an additive homomorphic encryption algorithm, based on the processing content.

The database control means 12 receives a database operation command (a database operation on plaintext data) or an instruction to execute a cryptographic protocol from the application response means 22, executes the database operation on plaintext data or the cryptographic protocol, and sends a processing result to the application response means 22. The database control means 12 may be implemented as a database server having the user system (10) as a client.

<User System>

The following describes each component in the user system 20. The database use application 21 issues database operation commands. The database use application 21 includes an application program that issues database operation commands (SQL commands) for executing database operations, but not limited thereto. Alternatively, the database utilization application 21 may be implemented as a GUI (Graphical User Interface) environment that causes the database control means 12 in the database system 10 to execute operations such as table definition and data addition, search, computation, and the like on screen via the application response means 22. In such case, an operation selected by a user on the screen is converted to a corresponding SQL command and is then inputted to the application response means 22. An existing application can be used without modification as the database utilization application 21. This does not mean prohibition of newly developing the database utilization application 21. It means that, when the database utilization application 21 is newly developed, modified, or updated, there is no need to set information for data encryption, data decryption, and security setting in the database utilization application 21.

The security setting means 26 sets information about the security of data.

For example, the key utilization means 23 refers to the key information storage unit 24 and generates keys necessary for executing various types of cryptographic protocols such as data encryption and data decryption.

The input/output apparatus 27 includes an input apparatus such as a keyboard, a mouse, or a touch panel and an output apparatus such as a display apparatus or a file apparatus (a printer). The input/output apparatus 27 displays or outputs information inputted or outputted by a database user. In FIG. 1, the input/output apparatus 27 is an integrated input and output apparatus such as a touch panel/tablet display. Alternatively, an input apparatus and an output apparatus may be used as the input/output apparatus 27.

The security setting information temporary storage unit 25 stores the information stored in the security setting information storage unit 14 and information for determining operation target data. For example, if metadata (for example, table and column names, etc.), which is information for determining data in the database 11, is encrypted, the encrypted metadata and decrypted metadata (plaintext metadata) corresponding thereto are associated with each other and are stored in the security setting information temporary storage unit 25.

Upon reception of a database operation command from the database utilization application 21, the application response means 22 refers to the security setting information temporary storage unit 25, the security setting information storage unit 14, and the cryptographic protocol information storage unit 13, replaces metadata such as table and column names with ciphertext metadata, executes a cryptographic protocol based on the database operation content (processing content), or executes a normal database operation, in coordination with the database control means 12 or the key utilization means 23.

For example, if the security of data needs to be dynamically set or changed in response to a database operation command inputted from the database utilization application 21, such as if a new table needs to be created, the application response means 22 calls up and causes the security setting means 26 to set security setting information and creates a table in the database 11 via the database control means 12.

In this operation, the security setting means 26 may display a screen for requesting the user to input security setting information. Regarding input of security setting information when a new table is created, various modes other than the above mode are possible. For example, before the database utilization application 21 issues a database operation command, security setting information such as encryption or non-encryption of the name of a newly-created table may be set in advance by the security setting means 26. Alternatively, for a table newly created in the database 11, confidentiality and cryptographic protocol identification information (default information) may be set in advance in a template having a table name, part of which has been replaced by a wildcard or the like. If a newly-created table matches the table name including the wildcard, encryption may be executed by a cryptographic protocol corresponding to the default confidentiality level.

When a database operation command inputted from the database utilization application 21 requires encryption of the operation target data, the application response means 22 encrypts the data. In such case, the application response means 22 encrypts the data by using key information and sends the encrypted data to the database control means 12. The application response means 22 sends a database operation result (a processing result) sent from the database control means 12 to the database utilization application 21. The database use application 21 outputs the database operation result to the input/output apparatus 27, but not limited thereto.

<Overview of Operation>

An operation example of the system illustrated in FIG. 1 will be described. For example, when a database operation command that is inputted from the database utilization application 21 and that is forwarded via the application response means 22 requires an operation such as a search operation (Query) that involves a cryptographic protocol that allows ciphertext to be processed without being decrypted, the database control means 12 executes processing on the encrypted data without decryption thereof (processing such as a search operation). The database control means 12 sends a result obtained by processing the encrypted data stored in the database 11 to the application response means 22, as is in cipher text, i.e., without decryption thereof. The application response means 22 receives a result obtained by causing the key utilization means 23 to decrypt the encrypted data into plaintext and sends the database operation result in plaintext to the database utilization application 21.

When a database operation command inputted from the database utilization application 21 is an operation that is difficult to execute on ciphertext as is in ciphertext (such as, a complex arithmetic computation involving addition, subtraction, multiplication, division, a logic computation and so forth), the database control means 12 extracts the operation target data in ciphertext from the database 11 and sends the extracted data to the application response means 22, without executing any computation operation. The application response means 22 decrypts the encrypted data sent from the database control means 12 by using a decryption key managed by the key utilization means 23, executes an operation specified by the database operation command on the obtained plaintext, and sends an operation result to the database utilization application 21.

In addition, the following operation is possible. When a complex arithmetic computation includes a computation such as an average computation that can be executed as is in ciphertext, the database control means 12 executes such partial computation on the encrypted data and sends a computation result (ciphertext) to the application response means 22. The application response means 22 causes the key utilization means 23 to decrypt the computation result from the encrypted data into plaintext and executes the remaining computation of the complex arithmetic computation in plaintext. In this way, higher processing efficiency can be achieved, compared with processing efficiency achieved when the complex arithmetic computation is executed with all the data being decrypted.

Upon reception of a database operation command from the database utilization application 21, the application response means 22 refers to the security setting information storage unit 14 and determines whether data in the database 11, which is the operation target of the inputted database operation command, needs to be protected by encryption (necessity of encryption). If encryption is not necessary, processing as in a normal database operation is executed. In addition, by referring to the security setting information temporary storage unit 25, even when metadata (for example, table and column names in SQL) of the data, which is the operation target of the database operation command inputted from the database utilization application 21, is encrypted, the application response means 22 can determine the operation target data.

As described above, according to the present exemplary embodiment, by referring to security setting information corresponding to an inputted database operation command, the application response means 22 can determine processing based on a security level required for data in the database 11 as the operation target. In this way, data requiring a lower security level can be processed at a relatively higher speed. In addition, by using an encryption algorithm requiring a relatively lower security level, processing can be executed more efficiently.

According to the present exemplary embodiment, among the data to be recorded in the database 11, if data requires a security level, the data is encrypted. Thus, for such data, information leakage can be prevented. In addition, since the present invention includes the application response means 22 that operates in coordination with other components, the present invention is applicable to arbitrary database operation commands inputted.

Figure 2A:
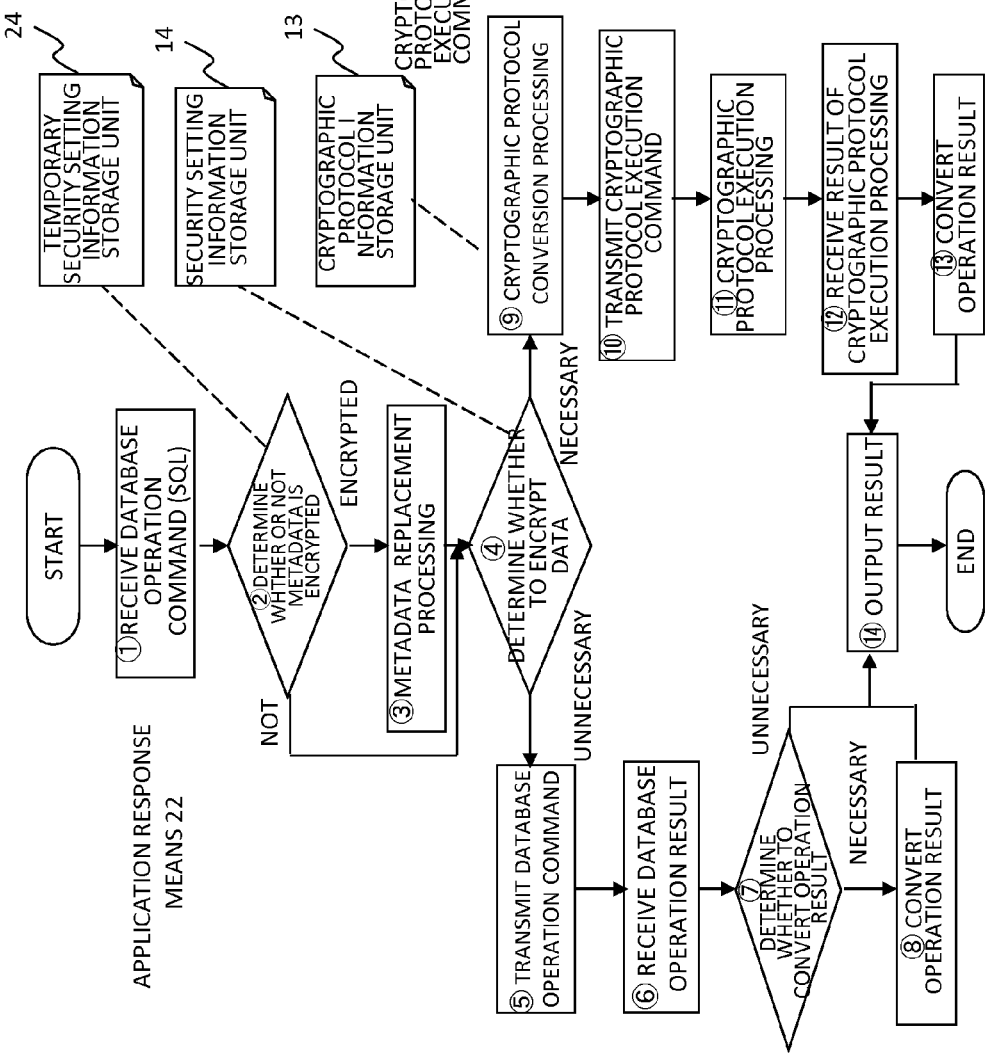
FIGS. 2A and 2B illustrate an overall operation according to the exemplary embodiment of the present invention.
Figure 2B:
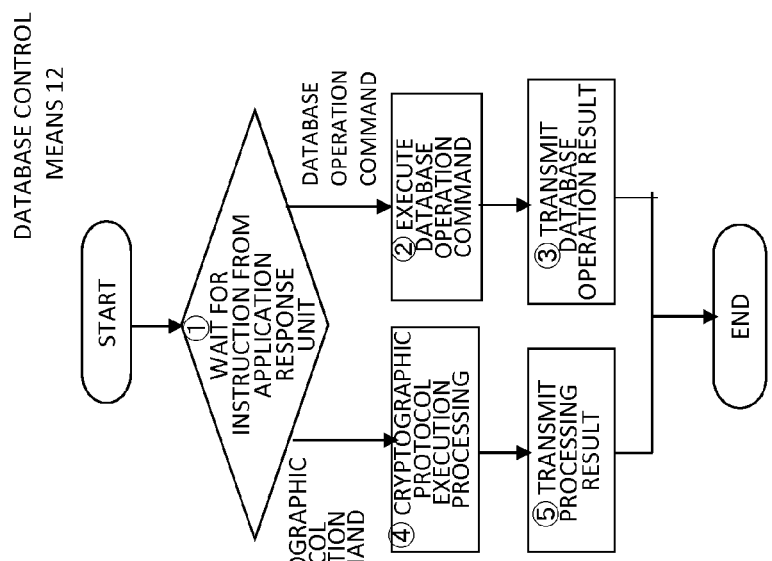

FIGS. 2A and 2B are flow charts summarizing processing operations of the application response means 22 and the database control means 12, respectively, according to the present exemplary embodiment.

<Operation of Application Response Means>

The following describes a processing operation of the application response means 22. Referring to FIG. 2A, the application response means 22 executes the following steps.

Step 1: The application response means 22 receives a database operation command from the database utilization application 21.

Step 2: By referring to the security setting information temporary storage unit 25, the application response means 22 determines whether or not metadata such as table and column names specified as an operation target by the database operation command is encrypted.

Step 3: When encrypting and storing metadata such as table and column names in the database, the application response means 22 executes replacement processing for replacing the metadata specified as the operation target by the database operation command with ciphertext.

Step 4: The application response means 22 refers to the security setting information storage unit 14 and determines whether to encrypt the data specified as the operation target by the database operation command.

Step 5: If data encryption is not necessary, the application response means 22 sends the database operation command to the database control means 12.

Step 6: The application response means 22 receives a database operation result from the database control means 12.

Step 7: The application response means 22 determines whether to convert the database operation result. This determination in step 7 is executed because an operation result may be sent in ciphertext from the database control means 12.

Step 8: If the database operation result needs to be converted (or decrypted), the application response means 22 converts the database operation result using a decryption key managed by the key utilization means 23. In this conversion processing (decryption), the application response means 22 uses a decryption key managed by the key utilization means 23 and refers to a decrypted table name and a decrypted column name in the security setting information temporary storage unit 25.

Step 14: The application response means 22 outputs an operation result (or a conversion result) to the database utilization application 21.

In step 4, if data encryption is necessary, the application response means 22 executes the following steps.

Step 9: The application response means 22 refers to the cryptographic protocol information storage unit 13 and executes encryption processing by using a corresponding encryption algorithm.

Step 10: The application response means 22 sends an instruction to execute a cryptographic protocol (a request for executing cryptographic protocol processing) to the database control means 12.

Step 11: The database control means 12 executes a cryptographic protocol.

Step 12: The application response means 22 receives a cryptographic protocol execution result from the database control means 12.

In steps 11 and 12, the application response means 22 and the database control means 12 may cooperate with each other in such a way in which the application response means 22 decrypts the computation result in ciphertext sent from the database control means 12 into plaintext and executes partial computation on the plaintext, the application response means 22 encrypts the result of the partial computation and sends the encrypted data to the database control means 12, and the database control means 12 executes a computation on the encrypted data.

Step 13: The application response means 22 executes conversion processing in which the cryptographic protocol execution result is decrypted by using key information managed by the key utilization means 23. The application response means 22 executes conversion processing on the execution result of the cryptographic protocol through decryption with use of key information managed by the key utilization means 23 or decryption with reference to a decrypted table name and a decrypted column name in the security setting information temporary storage unit 25.

Step 14: The application response means 22 outputs a conversion result to the database utilization application 21.

<Operation of Database Control Means>

Referring to FIG. 2B,

Step 1: The database control means 12 waits for an instruction from the application response means 22.

Step 2: Upon reception of a database operation command from the application response means 22, the database control means 12 executes the database operation command.

Step 3: The database control means 12 sends a database operation result to the application response means 22.

Step 4: Upon reception of a request for cryptographic protocol processing from the application response means 22, the database control means 12 executes a cryptographic protocol (corresponding to step 11 in FIG. 2A).

Step 5: The database control means 12 sends a execution processing result of the cryptographic protocol to the application response means 22.

Advantageous Effects of Exemplary Embodiment

Referring to FIGS. 2A and 2B, since the database control means 12 and the application response means 22 operate in coordination with each other, information leakage from the database system 10 is able to be prevented, an arbitrary database operation is allowed to be executed, and processing can be executed efficiently.

In the user system 20, key information for encryption and decryption is managed. Encrypted data in the database 11 is forwarded to the user system 20 and is decrypted in the user system 20, thereby reducing a possibility of occurrence of information leakage occurs in the database system 10.

The database system 10 includes the security setting information storage unit 14 that stores information about whether or not data is encrypted and extent of security required for data, in the database 11. Upon reception of a database operation command, the application response means 22 refers to the security setting information storage unit 14 and determines whether to encrypt the operation target data. When data encryption is not necessary (if a normal database operation needs to be executed), no encryption processing is executed (steps 5 and 6 in FIG. 2A). If encryption is executed for all the database operations, the processing performance is affected. However, by excluding data for which a confidentiality level is not required, from an encryption target, the processing performance is less affected.

In addition, regarding metadata (for example, table and column names in SQL) for determining data in the database, information about the correspondence between encrypted metadata and decrypted metadata is stored in the user system 20. Thus, even when metadata is encrypted in the database 11, the operation target data can easily be determined. Thus, the influence on the processing performance by encryption of metadata can be avoided.

<Configuration of Database Control Means>

The following describes the above database control means 12. FIG. 3 illustrates a configuration of the database control means 12 in FIG. 1. Referring to FIG. 3, the database control means 12 includes a database operation unit 121, a cryptographic protocol processing execution unit 122, a processing and communication control unit 125, a cryptographic protocol information operation unit 123, and a security setting information operation unit 124.

For example, the cryptographic protocol processing execution unit 122 executes an operation such as search, add or the like, as is in ciphertext, in the database 11.

The database operation unit 121 executes a database operation with respect to the database 11 (creates a table, adds/deletes data, searches for data, calculates data, etc.). For example, when the processing and communication control unit 125 receives a database operation command for storing, adding, deleting, or updating plaintext data in the database 11 from the application response means 22, the processing and communication control unit 125 forwards the plaintext data directly to the database operation unit 121. The database operation unit 121 executes a corresponding database operation on the plaintext data.

The cryptographic protocol processing execution unit 122 performs operation on data as is in ciphertext and accesses the database 11 via the database operation unit 121. For example, in the case of a command for acquiring columns B and C from table A in the database 11, i.e., SQL query SELECT B, C FROM A, if columns B and C in table name A in the database 11 are encrypted, the database operation unit 121 executes search processing on ciphertext and sends a search result to the cryptographic protocol processing execution unit 122.

The processing and communication control unit 125 communicates with the application response means 22 via the network 30 and controls each unit in the database control means 12.

The cryptographic protocol information operation unit 123 reads and writes cryptographic protocol information from and in the cryptographic protocol information storage unit 13. In response to a request for access to the cryptographic protocol information storage unit 13 from the application response means 22 (a read request), the cryptographic protocol information operation unit 123 accesses the cryptographic protocol information storage unit 13 and sends read cryptographic protocol information to the application response means 22 via the processing and communication control unit 125.

The security setting information operation unit 124 reads and writes security setting information from and in the security setting information storage unit 14. In response to a request for access to the security setting information storage unit 14 from the application response means 22 (a read request), the security setting information operation unit 124 accesses the security setting information storage unit and sends read security setting information to the application response means 22 via the processing and communication control unit 125.

<Variation 1 of Database Control Means>

FIG. 4 illustrates a variation of the database control means 12 in FIG. 3. Referring to FIG. 4, the cryptographic protocol information and the security setting information is stored in the database 11, as a cryptographic protocol information table 111 and a security setting information table 112. By issuing a database operation command (for example, a SQL command specifying a table name in the cryptographic protocol information table) to the database operation unit 121, the cryptographic protocol information operation unit 123 in FIG. 4 accesses information in the cryptographic protocol information table 111 in the database 11. Likewise, the security setting information operation unit 124 accesses information in the security setting information table 112 in the database 11 via the database operation unit 121.

<Variation 2 of Database Control Means>

Figure 26:
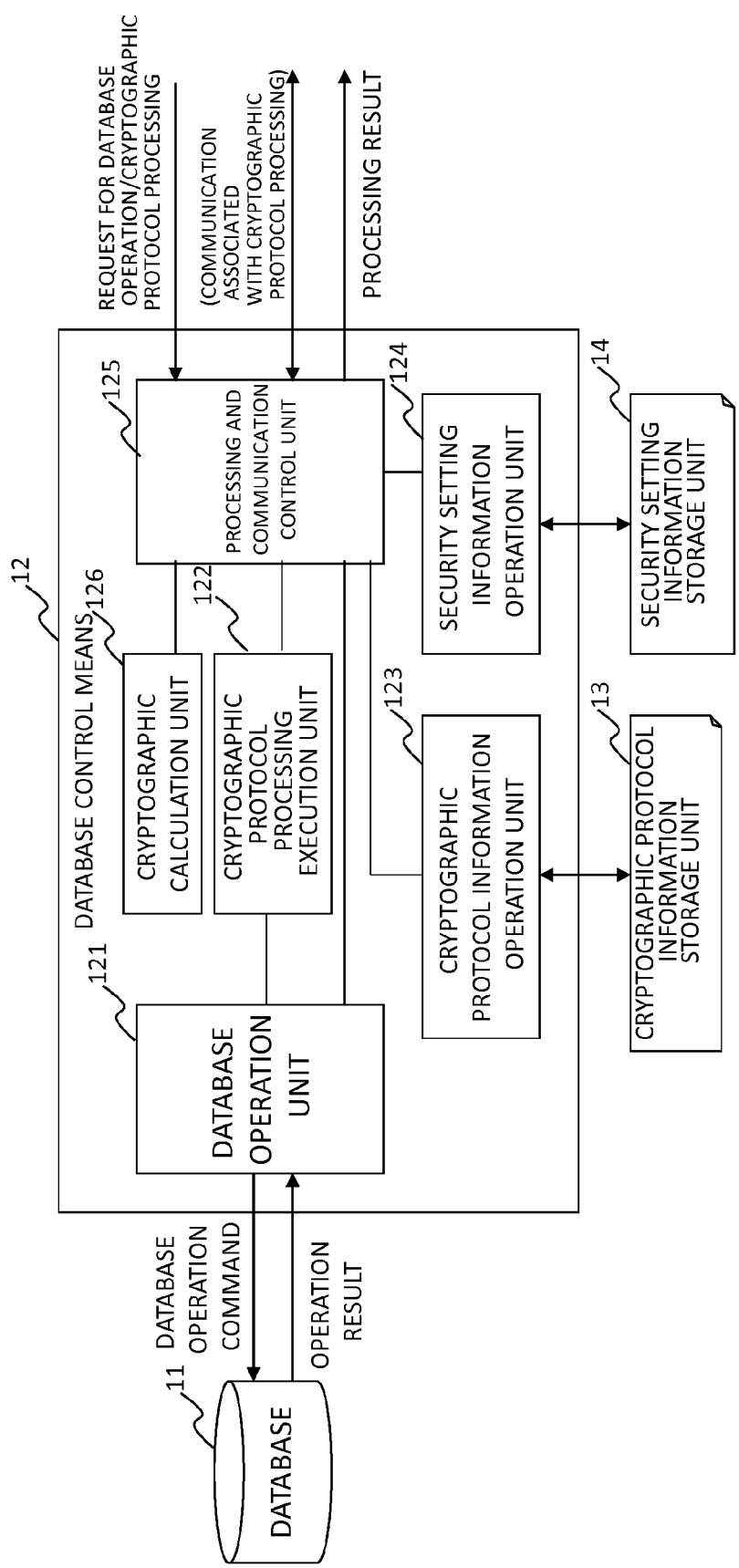
FIG. 26 illustrates another configuration of the database control means according to the exemplary embodiment of the present invention.

FIG. 26 illustrates still another configuration of the database control means 12 in FIG. 1. Referring to FIG. 26, the database control means 12 includes the database operation unit 121, the cryptographic protocol processing execution unit 122, the processing and communication control unit 125, the cryptographic protocol information operation unit 123, the security setting information operation unit 124, and an encryption calculation unit 126. FIG. 26 differs from FIG. 3 in that the database control means 12 includes the encryption calculation unit 126. Since the database operation unit 121, the cryptographic protocol processing execution unit 122, the processing and communication control unit 125, the cryptographic protocol information operation unit 123, and the security setting information operation unit 124 are the same as those in FIG. 3, description thereof will be omitted.

If the encryption algorithm corresponds to public key encryption, the application response means 22 sends a public key used for encryption to the database control means 12 and the encryption calculation unit 126 in the database control means 12 executes encryption. For example, with the configuration in FIG. 3, when data stored in the database 11 needs to be encrypted and stored, the encryption target data needs to be sent from the database system 10 to the user system 20, the sent data needs to be encrypted by the user system 20, and the encrypted data needs to be sent from the user system 20 to the database system 10. With the configuration in FIG. 26, since there is no need to transmit the encryption target data from the database system 10 to the user system 20, reduction in the communication amount between the database system 10 and the user system 20 is expected.

<Variation 3 of Database Control Means>

Figure 27:
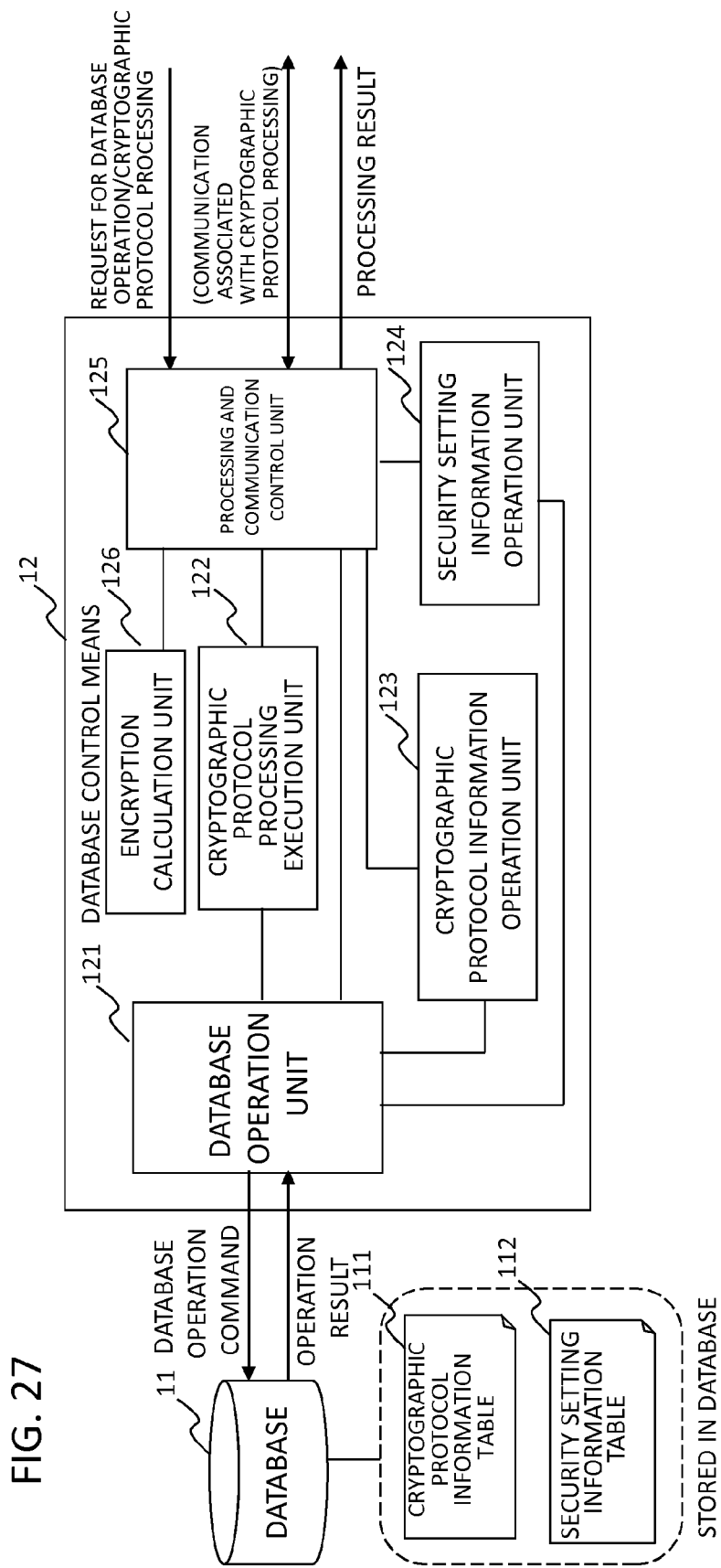
FIG. 27 illustrates still another configuration of the database control means according to the exemplary embodiment of the present invention.

FIG. 27 illustrates still another configuration of the database control means 12 in FIG. 1. Referring to FIG. 27, in the present exemplary embodiment, based on the configuration in FIG. 26, the cryptographic protocol information table 111 and the security setting information table 112 are included in the database 11 as in the configuration in FIG. 4. Since the encryption calculation unit 126 is the same as that in FIG. 26, description thereof will be omitted.

<Example of Cryptographic Protocol Information Storage Unit>

FIG. 5 illustrates the cryptographic protocol information storage unit 13 in FIG. 1. In FIG. 5, each processing content identifier is information determining a database operation processing content. Database operation determination codes such as "Simple-Search" (simply matched with a specified character string) and "Addition" are set in FIG. 5, but not limited thereto.

Each confidentiality level represents a data security (confidentiality) level. While the present invention is not particularly limited to FIG. 5, in this example, "High", "Middle", or "Low" is set for each entry. Each confidentiality level may be represented by a number.

Each encryption algorithm identifier represents an encryption algorithm used for data encryption. An executable cryptographic protocol identifier is stored for a corresponding processing content identifier, confidentiality level, and encryption algorithm identifier.

If "Simple-Search" processing is executed on data encrypted with a confidentiality level "Middle" and an encryption algorithm "SE1", the cryptographic protocol processing execution unit 122 in the database control means 12 executes a cryptographic protocol "SE1_SS_M" in the third row in FIG. 5. "SS" represents "Simple-Search" (simple match) and "M" represents a confidentiality "Middle."

The cryptographic protocol information operation unit 123 reads a cryptographic protocol identifier from the cryptographic protocol information storage unit 13 and decodes a corresponding processing content identifier, confidentiality level, and encryption algorithm identifier. In this way, a corresponding processing content, confidentiality level, and encryption algorithm for data are derived.

"AES (advance encryption standard)" is a symmetric-key cryptosystem standardized in the U.S. as a new standard. "HE1" represents a homomorphic encryption (HE) (in this case, the Paillier cryptosystem as an additive homomorphic encryption). "SE1" represents a searchable encryption (SE) of a public key system.

Referring to FIG. 5, even when processing content is the same processing content "Addition", the encryption algorism AES that is not a homomorphic encryption (addition cannot be executed on ciphertext) may be set. In such a case, the corresponding ciphertext in the database 11 is sent to the application response means 22, and the application response means 22 causes the key utilization means 23 to decrypt the encrypted data with the encryption algorithm AES and executes addition operation on the plaintext data.

<Example of Security Setting Information Storage Unit>

FIG. 6 illustrates the security setting information storage unit 14 in FIG. 1. Referring to FIG. 6, the security setting information storage unit 14 includes a column indicating whether table name is encrypted (encryption or non-encryption of table name), a column name, a column indicating whether column name is encrypted (encryption or non-encryption of each column name), a column indicating whether column data is encrypted (encryption or non-encryption of the column data), a column indicating the confidentiality level of the column data, and a column indicating identifier of encryption algorithm used for encrypting the column data (column data encryption algorithm identifier).

In the security setting information storage unit 14 in FIG. 6, for example, in the first row, the table name "Employee Table" is not encrypted, the column name "Work Location" is not encrypted, the column data is encrypted, "Middle" is set as the confidentiality level of the column data, and "SE1" is set as the encryption algorithm identifier. In the fourth row, the table name is encrypted and the column name and the column data are not encrypted (NULL is set in the corresponding entries). In addition, in the fifth row, the table name is not encrypted, the column name is encrypted, and the column data is not encrypted.

Metadata such as table and column names may be encrypted by the same encryption algorithm as that used for encrypting the corresponding column data. Such table name, column name, column data encrypted by the same encryption algorithm are associated with each other and form a single entry in the security setting information storage unit 14. Alternatively, an encryption algorithm used for encrypting table and column names may be different from that used for encrypting the corresponding column data. Alternatively, a certain encryption algorithm may commonly be set for a plurality of table and column names.

For example, the security setting information storage unit 14 stores security setting information about all the tables registered in the database 11. The setting content in each entry is based on information set by a user(s) via the security setting means 26 in the user system 20.

<Examples of Tables in Database>

FIG. 7 illustrates table information in the database 11. As illustrated in the above FIG. 6, there are cases where data is encrypted by a plurality of encryption algorithms. For example, two entries include the same column name "Work Location". Thus, such ciphertext itself encrypted by a plurality of encryption algorithms is managed by another table.

In a ciphertext table information table in FIG. 7B,
a name of a ciphertext table, which is a table storing a ciphertext main body (a ciphertext table name),
an encryption algorithm, and
a parameter (a parameter allocated to the encryption algorithm) are associated with a table name, a column name, and an encryption algorithm. Such associated information is stored in the ciphertext table information table.

As an encryption algorithm parameter, in the case of the encryption algorithm SE1 (Searchable Encryption is a public key) in FIG. 7B, there is a security parameter used for a key generation algorithm (outputting a public key and a secret key). As a parameter of the encryption algorithm AES, for example, there is a key length, a plaintext block length, a round number, or the like (no AES parameter is set in FIG. 7B. In such case, a default value is used).

Regarding the table name "Employee Table" in the first row in the ciphertext table information table in FIG. 7B,
the column name is "Work Location",
the encryption algorithm is "AES", and
the parameter is "Null" (N/A), and
the ciphertext table name is "Encrypted Text_AES_1".

Regarding the table name "Employee Table" in the second row in the ciphertext table information table in FIG. 7B,
the column name is "Work Location",
the encryption algorithm is "SE1",
the parameter is "0x16a . . . " (0x represents hexadecimal display), and
the ciphertext table name is "Encrypted Text_SE1_1".

The ciphertext table names "Encrypted Text_AES_1" and "Encrypted Text_SE1_1" are indicated by FIG. 7D and FIG. 7(F), respectively.

Serial numbers in plaintext are stored in entries under a column of a table (an employee table in FIG. 7A) in which plaintext data before encryption is stored. Serial numbers, such as 1, 2, and so on, are allocated to data such as "Headquarters", "Tamagawa", and the like in entries under the column "Work Location" in the table "Employee Table" in FIG. 7A.

In addition, as illustrated in FIG. 7C, in the employee table after encryption, the column name "Position" is encrypted to "0xa638 . . . " and serial numbers 1, 2, and so on in entries under the column name "Work Location" and the column name "0xa638 . . . " correspond to IDs specifying the respective encrypted contents.

In "Encrypted Text_AES_1 Table" in FIG. 7D encrypted by the encryption algorithm AES, ciphertext "0x3d8 . . . " and "0x962." corresponding to ID=1 and ID=2, respectively, is the encrypted data of the data corresponding to serial number IDs 1 and 2 under "0xa638 . . . " obtained by encrypting the column name "Work Location" by AES (encryption data of "Headquarters" and "Tamagawa" in FIG. 7A).

In "Encrypted Text_AES_2 Table" in FIG. 7(E) encrypted by the encryption algorithm AES, ciphertext "0x61b . . . " and "0xa53 . . . " corresponding to ID=1 and ID=2, respectively, is the encrypted data of the data corresponding to serial number IDs 1 and 2 under "0xa638 . . . " obtained by encrypting the column name "Position" (encryption data of "Section Chief" and "Chief" in FIG. 7A).

In "Encrypted Text_SE1_1 Table" in FIG. 7F encrypted by the encryption algorithm SE1, ciphertext "0x8ec . . . " and "0xA7c0 . . . " corresponding to ID=1 and ID=2, respectively, is the encrypted data of the data corresponding to serial number IDs 1 and 2 under "0xa638 . . . " obtained by encrypting the column name "Position" (encryption data of "Section Chief" and "Chief" in FIG. 7A).

As described above, regarding the data "Headquarters", "Tamagawa", and so on under the column name "Work Location" in the employee table in FIG. 7A, serial number IDs 1, 2, and so on are allocated to the respective entries under the column "Work Location" after encryption, as illustrated in FIG. 7C. Each ciphertext table storing encrypted data is stored in the database 11 in format as illustrated in FIGS. 7D to 7F, for example. Namely, each ciphertext table is stored so that serial number IDs 1, 2, and so on are associated with the respective ciphertext.

Thus, according to the present exemplary embodiment, information for determining a table storing ciphertext itself and encryption algorithm parameters are managed in the ciphertext table information table (FIG. 7B). The ciphertext table information table (FIG. 7B) may be stored in the security setting information storage unit 14. Alternatively, the ciphertext table information table may be managed in a storage unit different from the security setting information storage unit 14.

<Configuration Example of Application Response Means>

FIG. 8 illustrates configurations of the application response means 22, the security setting means 26, and the key utilization means 23 in FIG. 1. Referring to FIG. 8, the application response means 22 includes a processing and communication control unit 221, a cryptographic protocol processing execution unit 222, a database operation conversion processing unit 223, an encryption calculation unit 224, and a security setting information operation unit 225.

The security setting means 26 includes a setting display unit 261 and a setting input unit 262. The setting display unit 261 and the setting input unit 262 output and input information to the input/output apparatus 27 in FIG. 1, respectively. More specifically, an operation screen (menu) is displayed on a display apparatus of the input/output apparatus 27 so that the user can select or input information on the menu, for example.

The key utilization means 23 includes an encryption calculation unit 231 and a key information management unit 232.

For example, the processing and communication control unit 221 communicates with the database utilization application 21, the security setting means 26, the key utilization means 23, and the database control means 12 in the database system 10 and controls each unit in the application response means 22.

For example, the encryption calculation unit 224 executes encryption calculation using information that is not secret among the key information, such as encryption calculation using public key encryption.

In response to a database operation command inputted from the database utilization application 21, for example, based on the confidentiality level of the operation target data, the database operation conversion processing unit 223 determines whether to execute cryptographic protocol processing or a normal database operation. If encryption is needed, the database operation conversion processing unit 223 executes cryptographic protocol conversion processing (corresponding to steps 4 and 9 in FIG. 2A).

The database operation conversion processing unit 223 converts a processing result obtained through cryptographic protocol processing or a normal database operation from the database control means 12 into a processing result corresponding to the normal database operation command inputted (corresponding to steps 7, 8, and 13 in FIG. 2A).

The cryptographic protocol processing execution unit 222 executes cryptographic protocol processing such as search, addition, or multiplication that can be executed on ciphertext in the database control means 12 that accesses the database 11, based on processing content, by communicating with the database control means 12 (corresponding to step 11 in FIG. 2A).

The security setting information operation unit 225 gets information (including information about encryption or non-encryption of metadata, for example) stored in the security setting information storage unit 14 in the database system 10 via the processing and communication control unit 221 and creates auxiliary information for determining operation target data. The security setting information operation unit 225 reads and writes information from and in the security setting information temporary storage unit 25.

By storing (caching) information, which is stored in the security setting information storage unit 14 in the database system 10, in the security setting information temporary storage unit 25 in the user system 20, the number of queries (traffic) sent from the application response means 22 to the database system 10 is reduced and processing by the application response means 22 in the user system 20 is executed more quickly.

The setting display unit 261 in the security setting means 26 displays/outputs security setting information such as confidentiality information set to data stored in the database 11 to the output apparatus (27 in FIG. 1) via the application response means 22. The setting input unit 262 receives input information about data confidentiality information from the user via the input apparatus 27 and reflects the inputted setting information on the security setting information temporary storage unit 25 and on the security setting information storage unit 14 in the database system 10 via the application response means 22. In this operation, the inputted setting information may simultaneously be written in the security setting information temporary storage unit 25 and in the security setting information storage unit 14. Alternatively, the inputted setting information may be written only in the security setting information temporary storage unit 25 first and in the security setting information storage unit 14 next.

The encryption calculation unit 231 in the key utilization means 23 executes encryption calculation such as processing for decrypting ciphertext by using key information (secret key) read via the key information management unit 232.

The key information management unit 232 reads key information corresponding to the database operation target data and security setting information about the data from the key information storage unit 24 after authentication by a user who is an owner of the key information (for example, a user of the database utilization application 21 or a system manager on the user system). The key information management unit 232 writes key information in the key information storage unit 24.

<Example of Security Setting Information Temporary Storage Unit>

FIG. 9 schematically illustrates an example of content in the security setting information temporary storage unit 25 in the user system 20 in FIG. 1. The security setting information temporary storage unit 25 includes entries for "Decrypted Table Name" and "Decrypted Column Name" as auxiliary information for determining the database operation target, in addition to the content of the security setting information storage unit 14 in the database system 10 in FIG. 6. The other information is the same as that in the security setting information storage unit 14 in FIG. 6.

For example, FIG. 9 includes a table name "Employee Table" having an encrypted column name "0xa638 . . . ". It is seen that the corresponding decrypted plain-text column name is "Position" from the corresponding entry under the column "Decrypted Column Name". This represents a correspondence relationship between the column "Position" in the table "Employee Table" in FIG. 7A and the encrypted column name "0xa638 . . . " in FIG. 7C.

In FIG. 9, for example, to execute a database query for referring to a table name "XX Table" in the database 11, it is necessary to refer to encrypted table name "0x30c8a4 . . . " in the database 11.

If a database operation command inputted from the database utilization application 21 includes the table name "XX Table" (for example, SQL command: select column name, from "XX table"), the security setting information operation unit 225 extracts the encrypted table name "0x30c8a4 . . . " corresponding to "XX Table" from the security setting information temporary storage unit 25 and sends a database operation command relating to the encrypted table name "0x30c8a4 . . . " (select column name, from "0x30c8a4 . . . ") to the database control means 12 via the cryptographic protocol processing execution unit 222 and the processing and communication control unit 221.

<Example of Key Information Storage Unit>

FIG. 10 illustrates the key information storage unit 24. The key information storage unit 24 includes encryption algorithm identifiers and key information. In FIG. 9, key information used for encrypting and decrypting data with the encryption algorithm "AES" is "0x51a4 . . . ". In addition, key information used for an encryption algorithm HE1 as public key encryption is "0xb316 . . . ". The key information includes public key information used for encryption and homomorphic operation processing and secret key information used for decryption.

<Processing of Security Setting Means>

Hereinafter, a processing procedure executed via the security setting means 26 described with reference to FIGS. 1 and 8 will be described in detail. The security setting means 26 in the user system 20 sets security information about data in the database 11.

Figure 11:
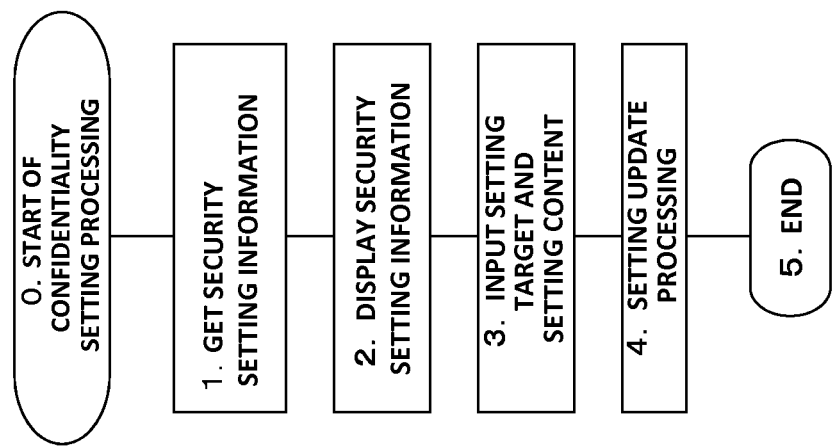
FIG. 11 is a flowchart illustrating a processing flow by a security setting means according to the exemplary embodiment of the present invention.

FIG. 11 is a flowchart illustrating a processing procedure executed via the security setting means 26. For example, an existing application may be used as the database utilization application 21. In the present exemplary embodiment, to avoid modification of an existing application, processing for setting a confidentiality level or the like to data is realized by inputting a confidentiality level via the security setting means 26. A processing flow executed via the security setting means 26 will be described with reference to FIG. 11.

Step 1. Getting Security Setting Information:

The application response means 22 is requested to acquire current security setting information about the database 11. The application response means 22 refers to the security setting information storage unit 14 in the database system 10 or to the security setting information temporary storage unit 25 in the user system 20, gets security setting information corresponding to the database operation target data or the like, and sends the security setting information to the security setting means 26.

When the security setting information (see FIG. 6) from the security setting information storage unit 14 is obtained, the application response means 22 creates and sends the data format of the security setting information temporary storage unit 25 (see FIG. 9). Namely, in the security setting information (see FIG. 6) obtained from the security setting information storage unit 14, if encryption of metadata (table and column names) is "Applied", the application response means 22 decrypts the encrypted metadata by using the key utilization means 23, creates plaintext metadata, and sends the created plaintext metadata to the security setting means 26. Alternatively, in the security setting information (see FIG. 9) obtained from the security setting information temporary storage unit 25, if encryption of metadata (table and column names) is "Applied", the application response means 22 sends information under the columns "Decrypted Table Name" and "Decrypted Column Name" (plaintext metadata) to the security setting means 26.

Regarding the acquisition of the security setting information in step 1, information about table names or about certain tables may be obtained and displayed selectively (partially) or gradually, instead of the entire information in the database 11.

Step 2. Displaying Security Setting Information:

The setting display unit 261 in the security setting means 26 causes the input/output apparatus 27 to display the security setting information sent from the application response means 22.

Step 3. Inputting Setting Target and Setting Content:

The setting input unit 262 in the security setting means 26 receives a setting target (for example, table and column names) and setting content (for example, application of encryption of table and column names and the confidentiality level of column data) inputted by the database user via the input/output apparatus 27.

Step 4. Setting Update Process:

The setting input unit 262 in the security setting means 26 sends the inputted setting target and content to the application response means 22 to request change (update) of the setting. The security setting information operation unit 124 in the database control means 12 and the security setting information operation unit 225 in the application response means 22 write the change of the security setting in the security setting information storage unit 14 and the security setting information temporary storage unit 25, respectively.

If a new table is created in the database 11, the execution timing of the processing procedure of the security setting means 26 illustrated in FIG. 11 may previously be set by the user, before the database utilization application 21 issues a table creation command. Alternatively, when the database utilization application 21 issues a table creation command, if a corresponding table name or the like is not registered in the security setting information storage unit 14 or the security setting information temporary storage unit 25, the security setting means 26 may display a screen requesting the user to input information about a table name, a column name, encryption or non-encryption of the table and column names, the confidentiality level of column data, etc. If the user changes the security setting of a table or the like created in the database 11, the security setting is changed via the security setting means 26. In such case, while use of a GUI (Graphical User Interface) is arbitrary, the security setting means 26 may cause the input/output apparatus 27 to select and execute a table list display command or the like as an operation menu, for example, to display a list of some or all the table names on the screen (if a table name is encrypted, for example, a decrypted table name in the security setting information temporary storage unit 25 is referred to, so that the table name is displayed in plaintext). By requesting the user to select a relevant table and setting operation, the corresponding setting information can be updated.

<Setting Update Processing (Change of Encryption to "Applied")>

Figure 12:
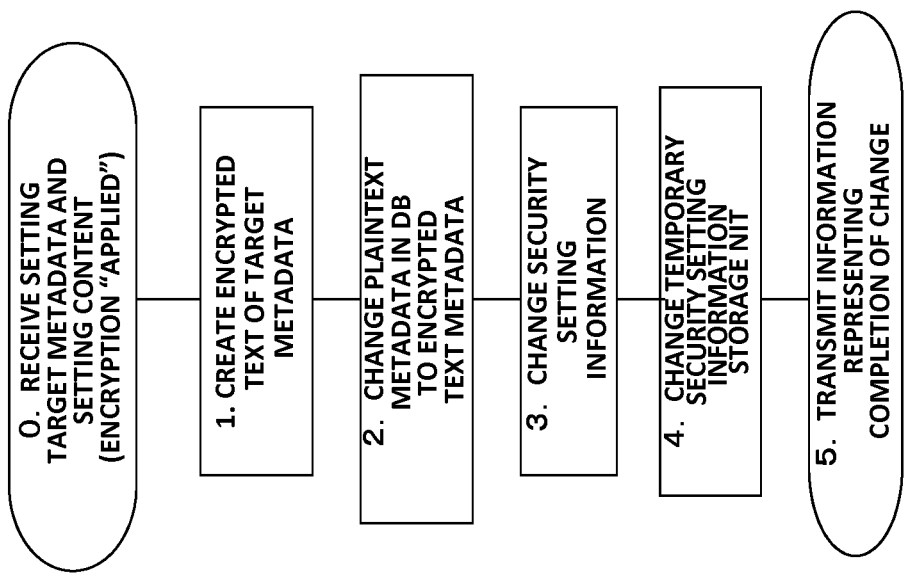
FIG. 12 is a flowchart illustrating processing for setting application of encryption in a setting update step in FIG. 11.

FIG. 12 is a flowchart illustrating detailed processing of the setting update processing in step 4 in FIG. 11. FIG. 12 illustrates processing for setting encryption of metadata (a table name and/or a column name) to "Applied". The following description will be made assuming that encryption of target metadata (a table name and/or a column name) has already been set to "NULL" in the security setting information storage unit 14 and the security setting information temporary storage unit 25.

Step 0:

The security setting means 26 receives setting target metadata (a table name and/or a column name) and setting content (encryption "Applied") from the input/output apparatus 27.

Step 1. Creating ciphertext of target metadata:

Upon reception of a setting update request from the security setting means 26, the application response means 22 uses the key utilization means 23 to create ciphertext of the setting target metadata (a table name and/or a column name). The application response means 22 refers to the security setting information temporary storage unit 25 or the security setting information storage unit 14 and gets encryption algorithm information corresponding to the metadata. In addition, the application response means 22 causes the encryption calculation unit 231 to encrypt the metadata (a table name and/or a column name) and creates ciphertext metadata.

Step 2. Changing plaintext metadata in database to ciphertext metadata:

Upon reception of a setting change instruction from the security setting means 26, the application response means 22 requests the database control means 12 to replace the setting target metadata in the database 11 with the encrypted data metadata created in the above step 1. The database control means 12 replaces the plaintext metadata in the database 11 with the encrypted data metadata. Since the following examples are implementation-specific operations, the present invention is not particularly limited thereto. For example, when a table name is changed to ciphertext, the application response means 22 may use the following SQL command:

ALTER TABLE table before change RENAME TO table name after change

A SQL statement including the ciphertext table name as the table name after change may be automatically generated and issued to the database operation unit 121 (FIG. 4) in the data control means 12. When a column name is changed to ciphertext, for example, the following SQL command may be used:

ALTER TABLE table name RENAME COLUMN column name before change TO column name after change A SQL statement including the encrypted data column name as the column name after change may be automatically generated by the application response means 22 and issued to the database operation unit 121 (FIG. 4).

Step 3. Changing security setting information:

The application response means 22 causes the security setting information storage unit 14 (see FIG. 6) to replace the plaintext table or column name as the setting target with the ciphertext table name or the encrypted data column name via the database control means 12. In addition, the application response means 22 requests the security setting information operation unit 124 in the database control means 12 to change "Encryption of Table Name" and "Encryption of Column Name" to "Applied". In this way, the security setting information in the security setting information storage unit 14 is changed. In addition, the corresponding table and column names in the ciphertext table information table (FIG. 7B) are replaced with the ciphertext table and column names.

Step 4. Changing security setting information temporary storage unit:

The security setting information operation unit 225 in the application response means 22 refers to the security setting information temporary storage unit 25 (see FIG. 9) and writes the original plaintext table name or column name as the setting target in the corresponding entry under "Decrypted Table Name" or "Decrypted Column Name". The table name or the column name is replaced with the ciphertext table name or the encrypted data column name, and the corresponding entry under "Encryption of Table Name" or "Encryption of Column Name" is changed to "Applied".

Step 5. Sending information representing completion of change:

The application response means 22 sends information representing completion of the change of the setting (setting update processing) to the security setting means 26. The security setting means 26 displays the information representing the completion on the input/output apparatus 27. In such a case, the content after the change of the setting in the security setting information temporary storage unit 25 may be displayed on the screen to present the completion of the change to the user.

The security setting means 26 may simultaneously or separately change encryption of the table name and encryption of the column name to "Applied". Alternatively, encryption of a plurality of tables or a plurality of columns may collectively be changed to "Applied". In such case, the above steps 1 to 4 are executed to each of the tables/columns.

<Setting Update Process (Change of Encryption to "NULL")>

Figure 13:
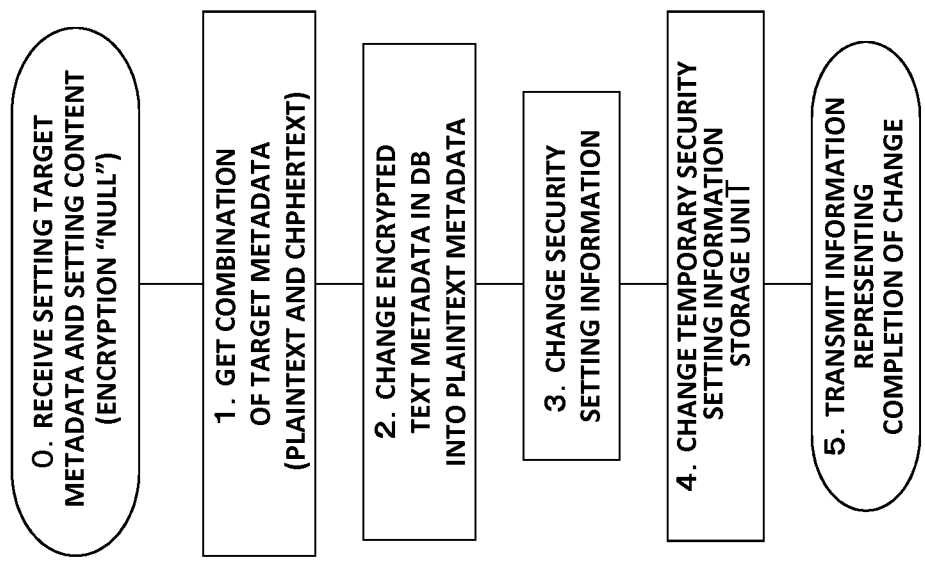
FIG. 13 is a flowchart illustrating processing for setting non-application of encryption in the setting update step in FIG. 11.

Next, processing for changing to encryption "NULL" will be described, as a detail processing procedure of the setting update process in step 4 in FIG. 11. FIG. 13 is a flowchart illustrating another example of the setting update processing in step 4 in FIG. 11. FIG. 13 illustrates a processing procedure for changing encryption of metadata (a table name and/or a column name) from "Applied" to "NULL". The following description will be made assuming that encryption of metadata (a table name and/or a column name) has already been set to "Applied".

Step 0: The security setting means 26 receives setting target metadata (a table name and/or a column name) and setting content (encryption "NULL") from the input/output apparatus 27.

Step 1. Getting a set of metadata (plaintext and ciphertext):

Upon reception of a setting change instruction from the security setting means 26, the application response means 22 refers to the security setting information temporary storage unit 25 (see FIG. 9), gets ciphertext metadata in the database 11 regarding the setting target metadata (a table name or a column name), and gets a corresponding plaintext table name or column name from a corresponding entry under the column "Decrypted Table Name" or "Decrypted Column Name".

Step 2. Changing ciphertext metadata in database 11 into plaintext metadata:

The application response means 22 requests the database control means 12 to replace the encrypted data metadata (a table name or a column name) with the corresponding plaintext metadata. The table name/column name in the database 11 is replaced with the plaintext table name/column name. When a table name is changed, for example, the database control means 12 may issue the following SQL command:

ALTER TABLE table name before change RENAME TO table name after change

A SQL statement including the table name before change as the encrypted data and the table name after change as the plaintext table name may be issued to the database operation unit 121 (FIG. 4). When a column name is changed to ciphertext, for example, the following SQL command may be issued.

ALTER TABLE table name RENAME COLUMN column name before change TO column name after change A SQL statement including the column name before change as the encrypted data and the column name after change as the plaintext may be issued to the database operation unit 121 (FIG. 4). In addition, the corresponding table and column names in the ciphertext table information table (FIG. 7B) are replaced with the plaintext table and column names.

Step 3. Changing security setting information:

The database control means 12 is requested to replace the entries under "Encrypted Text Table Name" or "Encrypted Text Column Name" in the security setting information storage unit 14 (see FIG. 6) with the plaintext table or column name. In addition, a request for changing information under the column "Encryption of Table Name" or "Encryption of Column Name" to "NULL" is sent. The security setting information operation unit 124 in the database control means 12 changes the security setting information.

Step 4. Changing security setting information temporary storage unit:

The security setting information operation unit 225 in the application response means 22 replaces the ciphertext table or column name with the corresponding plaintext table or column name, changes the corresponding entry under the column "Decrypted Table Name" or "Decrypted Column Name" to "NULL", and changes the corresponding entry under the column "Encryption of Table Name" or "Encryption of Column Name" to "NULL" in the security setting information temporary storage unit 25 (see FIG. 9).

Step 5. Sending information representing completion of change:

The application response means 22 sends information representing completion of the change to the security setting means 26.

The security setting means 26 may simultaneously or separately change the corresponding entries under "Encryption of Table Name" and "Encryption of Column Name" to "NULL". Alternatively, encryption of a plurality of tables or a plurality of columns may collectively be changed to "NULL". In such case, the above steps 1 to 4 are executed to each of the tables/columns.

<Confidentiality Setting Processing>

In the present exemplary embodiment, to avoid modification of the existing database use application 21, an operation for setting a data confidentiality level is executed via the security setting means 26. The security setting means 26 queries the application response means 22 about current content of the security setting information storage unit 14 and content of the database 11. Instead of querying about all the information at once, the security setting means 26 may partially or in a stepwise manner, query about the information, for example, by querying about a list of all table names first and a list of column names and security settings of certain tables next.

The application response means 22 reads the contents of the security setting information storage unit 14. If metadata is encrypted, the application response means 22 uses the key utilization means 23 to decrypt the encrypted metadata and sends the decrypted metadata to the security setting means 26.

According to the present exemplary embodiment, processing efficiency can be improved by using information stored in the security setting information temporary storage unit 25.

The application response means 22 reads the contents of the database 11 via the database control means 12. If metadata (table and column names) and column data is encrypted, the application response means 22 uses the key utilization means 23 to decrypt the metadata and the column data and sends the decrypted metadata and column data to the security setting means 26. The security setting means 26 displays security setting information and database information.

The database user specifies encryption or non-encryption of metadata and the confidentiality level of column data (for example, one of the three levels "Low", "Middle", and "High") to the security setting means 26 via the input/output apparatus 27.

The security setting means 26 sends the inputted confidentiality information to the application response means 22. The application response means 22 reflects the confidentiality information sent from the security setting means 26 on the security setting information temporary storage unit 25 and causes the security setting information storage unit 14 to change the contents of the database 11 via the database control means 12.

<Confidentiality Setting 1>

Figure 14:
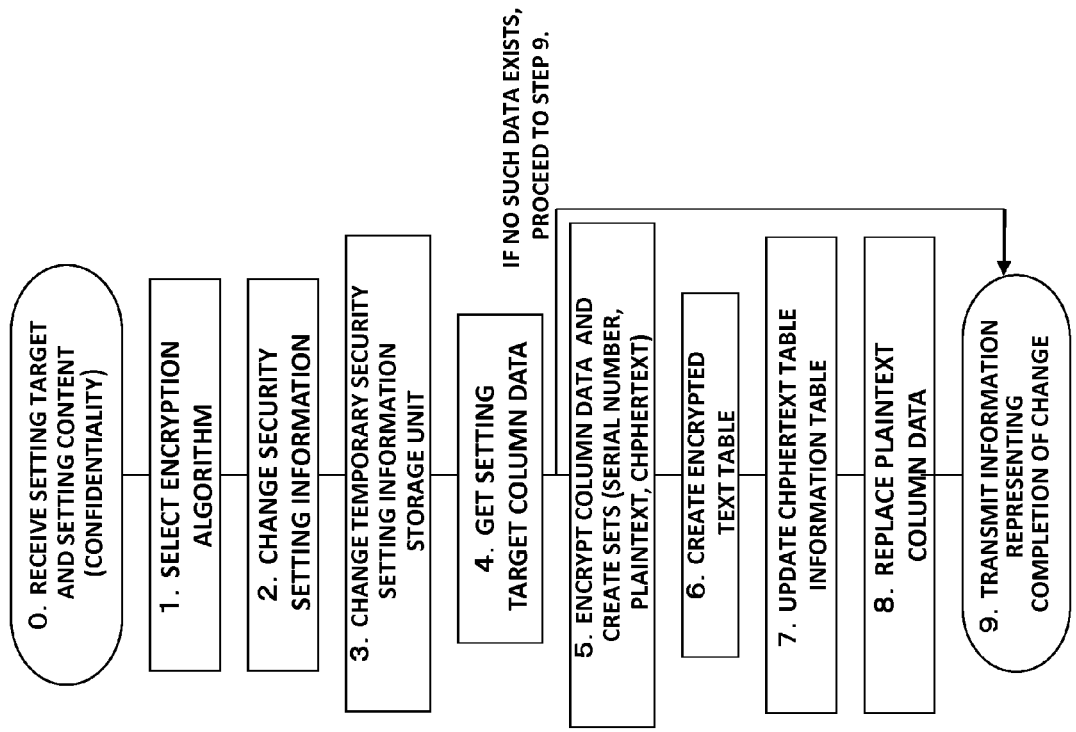
FIG. 14 is a flowchart illustrating processing for setting a confidentiality level in the setting update step in FIG. 11.

FIG. 14 is a flowchart illustrating a processing procedure for setting a confidentiality level to plaintext column data stored in the database 11 (for encrypting plaintext column data).

Step 0.

The application response means 22 receives a setting target table name and column name and setting content (confidentiality) from the security setting means 26.

Step 1. Selecting encryption algorithm:

The application response means 22 refers to the cryptographic protocol information storage unit 13 (see FIG. 5), gets a list of encryption algorithm identifiers corresponding to the inputted confidentiality level (High, Middle, Low), and selects one of the encryption algorithm identifiers. If one of the encryption algorithm identifiers corresponding to a single confidentiality level is selected from the list, one that can achieve good processing efficiency is selected. The application response means 22 may automatically select such encryption algorithm identifier. Alternatively, the list of encryption algorithm identifiers may be displayed on the screen via the security setting means 26 and the user changing the confidentiality level may select an encryption algorithm identifier.

Step 2. Changing security setting information:

The application response means 22 requests the security setting information operation unit 124 in the database control means 12 to change the corresponding entry under "Confidentiality of Column Data" corresponding to the setting target table name and column name in the security setting information storage unit 14 (see FIG. 6) to the inputted confidentiality level. In addition, the application response means 22 requests the security setting information operation unit 124 to change the corresponding entry under "Column Data Encryption Algorithm Identifier" to the encryption algorithm identifier selected in step 1. In this way, the security setting information in the security setting information storage unit 14 is updated. If the setting target table name and column name are encrypted, the application response means 22 searches the decrypted table names or the decrypted column names in the security setting information temporary storage unit 25 for table and column names matching the plaintext table name or the plaintext column name inputted from the security setting means 26. Next, the application response means 22 gets the corresponding ciphertext table name or ciphertext column name and determines the setting-target ciphertext table name and ciphertext column name in the security setting information storage unit 14 (see FIG. 6).

Step 3. Changing security setting information temporary storage unit:

The security setting information operation unit 225 in the application response means 22 causes the security setting information temporary storage unit 25 to change the corresponding entry under "Confidentiality of Column Data" corresponding to the setting target table name and column name from "Null" to the inputted confidentiality level and to change the corresponding entry under "Column Data Encryption Algorithm Identifier" to the encryption algorithm identifier selected in step 1.

Step 4. Getting setting target column data:

The application response means 22 requests the database control means 12 to acquire column data corresponding to the setting target table name and column name and gets the column data. As described above, the column data is stored in a ciphertext table (FIG. 7) in the database 11. If the database does not include the column data of the corresponding column, the operation proceeds to step 9.

Step 5. Encrypting column data and creating serial numbers, plaintext, and ciphertext:

The application response means 22 sends the obtained column data (plaintext column data) and the encryption algorithm identifier selected in step 1 to the key utilization means 23 and requests the key utilization means 23 to encrypt the column data. The application response means 22 allocates serial numbers to the obtained ciphertext column data and creates a list including a set of [serial number, plaintext column data, ciphertext column data].

Step 6. Creating ciphertext table:

The application response means 22 requests the database control means 12 to create a table storing a list including a set of [serial number, ciphertext column data] created in step 5 and creates a ciphertext table in the database 11 (the ciphertext table name is ciphertext_encryption algorithm identifier, as illustrated in FIG. 7B).

Step 7. Updating ciphertext table information table:

The application response means 22 requests the database control means 12 to add a set of [setting target table name, setting target column name, encryption algorithm identifier selected in step 1, ciphertext table name created] in the ciphertext table information table (see FIG. 7B). The database control means 12 adds the combination of [table name, column name, encryption algorithm identifier, ciphertext table name] in the ciphertext table information table (see FIG. 7B).

Step 8. Replacing plaintext column data:

The application response means 22 requests the database control means 12 to replace the corresponding plaintext column data under the database operation target column (for example, the data under the column name "Work Location" in FIG. 7A) with the serial numbers associated in the combination of [serial number, plaintext column data, ciphertext column data] created in step 5 (see FIG. 7C). The database control means 12 associates ID=1, 2, and so on with the encrypted data column data encrypted in step 5, respectively, in the ciphertext table and stores the associated information (see the storage formats in FIGS. 7D to 7F).

Step 9. Sending information representing completion of change:

The application response means 22 sends information representing completion of the change to the security setting means 26.

Other than cases in which plaintext column data already stored in the database 11 is encrypted by an encryption algorithm corresponding to a confidentiality level and is stored in the database 11, the procedure in FIG. 14 is also applicable to such cases in which plaintext column data is stored in the database 11 in response to a database operation command inputted to the application response means 22 (for example, cases in which, while a confidentiality level has been set to newly-registered column data via the security setting means 26, an encryption algorithm or the like has not been selected yet).

<Confidentiality Setting 2>

Figure 28:
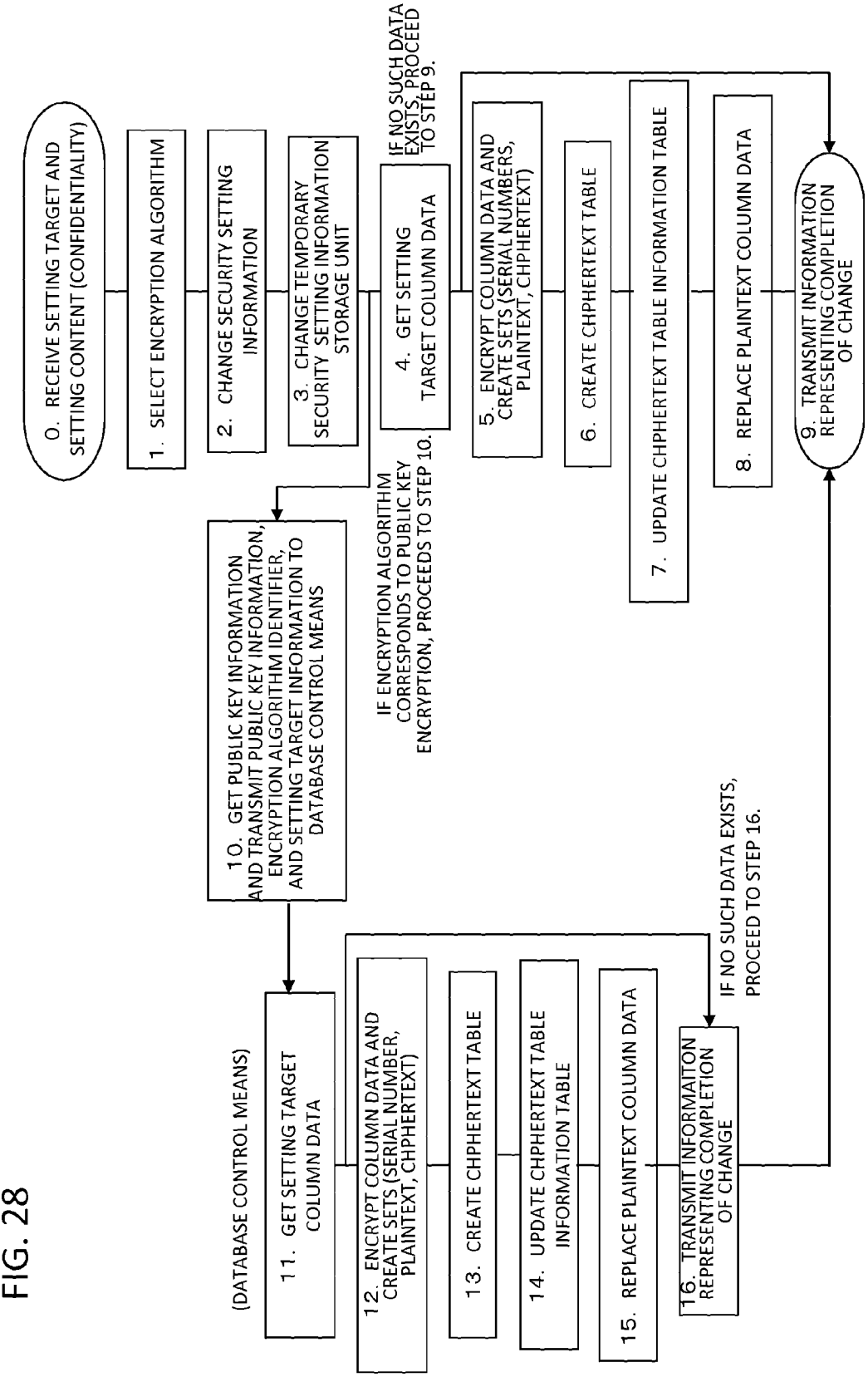
FIG. 28 is a flowchart illustrating another example of the processing for setting a confidentiality level according to the exemplary embodiment of the present invention.

The procedure illustrated in FIG. 14 is a processing procedure for setting a confidentiality level to plaintext column data stored in the database 11 when the database control means 12 has the configuration in FIG. 3 or FIG. 4. FIG. 28 is a flowchart illustrating a processing procedure for setting a confidentiality level to plaintext column data stored in the database 11 when the database control means 12 has the configuration in FIG. 26 or FIG. 27. In FIG. 28, steps 1 to 9 are the same as those in FIG. 14. In FIG. 28, if the encryption algorithm selected in step 1 corresponds to public key encryption such as HE1, the branching to step 10 is performed after step 3.

Step 10: If the encryption algorithm selected in step 1 corresponds to public key encryption such as HE1, the application response means 22 gets public key information via the key utilization means 23, sends the public key information and the corresponding encryption algorithm identifier to the database control means 12, and requests the database control means 12 to encrypt the plaintext column data.

Step 11: The database control means 12 gets the setting target plaintext column data from the database 11. If there is no corresponding column data, branching to step 16 is performed.

Step 12: The encryption calculation unit 126 in the database control means 12 encrypts the column data, by using the encryption algorithm identifier and the public key information received from the application response means 22. The database control means 12 allocates serial numbers to the obtained ciphertext column data and creates a list including a set of [serial number, plaintext column data, ciphertext column data].

Step 13: The database control means 12 creates a ciphertext table (see FIGS. 7D to 7F) storing a list including a set of [serial number, ciphertext column data].

Step 14: The database control means 12 adds a set of [setting target table name, setting target column name, encryption algorithm identifier selected in step 1, ciphertext table name created in step 12] in the ciphertext table information table (see FIG. 7B).

Step 15: The database control means 12 replaces the corresponding plaintext column data under the operation target column with the serial numbers associated in the combination of [serial number, plaintext column data, ciphertext column data] created in step 12 and stores the obtained information in the database 11.

Step 16: The database control means 12 sends information representing completion of the encryption of the plaintext column data to the application response means 22. The application response means 22 sends the information representing completion of the change to the security setting means 26 (step 9).

<Change of a Confidentiality Level>

Next, processing for reflecting a column data confidentiality level in the security setting information storage unit 14, the security setting information temporary storage unit 25, and the database 11 will be described. The following description will be made assuming that a confidentiality level has already been set.

The application response means 22 refers to the security setting information storage unit 14, gets information about a column data confidentiality level that has already been set to a specified column, and compares the column data confidentiality level with a newly specified confidentiality level. If the confidentiality level is the same, the application response means 22 does not execute any processing. If the newly specified confidentiality level is lower than the column data confidentiality level already set in the security setting information storage unit 14, the application response means 22 changes the corresponding entry under "Confidentiality of Column Data" in the security setting information to the newly specified confidentiality level.

Figure 15:
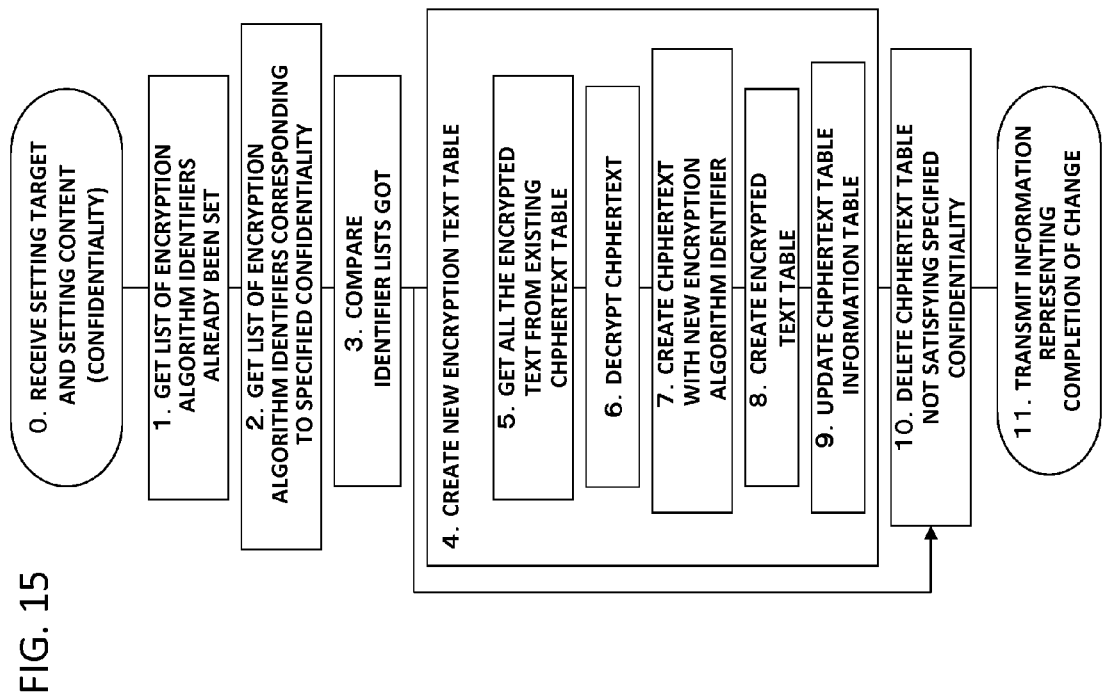
FIG. 15 illustrates a processing flow executed by the application response means according to the exemplary embodiment of the present invention to reflect a setting target and setting content inputted via the security setting means.

If the confidentiality level specified via the security setting means 26 is higher than the column data confidentiality level already been set in the security setting information storage unit 14, step 4 and subsequent steps thereto in FIG. 15 will be executed.

FIG. 15 illustrates a processing flow executed by the application response means 22 to reflect a setting target and setting content inputted via the security setting means 26. Processing for changing a set confidentiality level (to a higher level) (processing by the application response means 22) will be described with reference to FIG. 15.

Step 0:

The application response means 22 receives a setting target table name and column name and setting content (change of a confidentiality level) from the security setting means 26.

Step 1. Getting list of encryption algorithm identifiers already been set:

The application response means 22 gets a list of encryption algorithm identifiers used for encryption of the column data specified by the inputted setting-target table name and column name from the security setting information storage unit 14 (see FIG. 6) in the database system 10. If the setting-target table name and column name are encrypted, the application response means 22 searches the decrypted table names or decrypted column names in the security setting information temporary storage unit 25 for the table name and column name matching the plaintext table name or the plaintext column name inputted via the security setting means 26, gets the corresponding ciphertext table name or ciphertext column name, and determines the setting target ciphertext table name and ciphertext column name in the security setting information storage unit 14 (see FIG. 6).

Step 2. Getting list of encryption algorithm identifiers corresponding to specified confidentiality level:

The application response means 22 refers to the cryptographic protocol information storage unit 13 (FIG. 5) in the database system 10 and gets a list of encryption algorithm identifiers corresponding to the newly-inputted confidentiality level.

Step 3. Comparing encryption algorithm identifiers:

The application response means 22 compares the list of encryption algorithm identifiers obtained in step 1 with the list of encryption algorithm identifiers corresponding to the list of the new confidentiality level obtained in step 2.

Step 4. Creating new ciphertext table:

As a result of the comparison in step 3, if a common encryption algorithm identifier does not exist in the list of encryption algorithm identifiers obtained in step 1 and the list of encryption algorithm identifiers corresponding to the new confidentiality level obtained in step 2, the application response means 22 creates a new ciphertext table in accordance with the following procedure. If a common encryption algorithm identifier exists, since data encrypted by an encryption algorithm with the same confidentiality level exists, the following confidentiality change processing is not executed (processing for re-encrypting data by an encryption algorithm corresponding to the new confidentiality information, creating a ciphertext table, and updating the ciphertext table information).

Step 5. Getting all the encrypted data from existing ciphertext table:

If a plurality of encryption algorithm identifiers are included in the list of encryption algorithm identifiers obtained in step 1, the application response means 22 selects one of the encryption algorithm identifiers (if only one encryption algorithm identifier is included, that encryption algorithm identifier is selected) and requests the database control means 12 to acquire the content of the ciphertext table corresponding to the selected encryption algorithm identifier from the database 11. The database control means 12 refers to the ciphertext table information table (see FIG. 7B), identifies a ciphertext table name corresponding to the selected encryption algorithm identifier, gets the content of the identified ciphertext table (the content is stored in format in which an ID and a ciphertext are stored in a pair format), and sends the content to the application response means 22.

Step 6. Decrypting ciphertext:

The application response means 22 sends the encryption algorithm identifier selected in step 5 and the obtained ciphertext to the key utilization means 23 and requests the key utilization means 23 to decrypt the encrypted data into plaintext.

Step 7. Creating ciphertext with encryption algorithm having new identifier:

If the list of encryption algorithm identifiers corresponding to the confidentiality level obtained in step 2 includes a plurality of encryption algorithm identifiers that are included only therein (that are not included in the list of encryption algorithm identifiers obtained in step 1), the application response means 22 selects one of the encryption algorithm identifiers (if only one encryption algorithm identifier is included, that encryption algorithm identifier is selected), sends the selected encryption algorithm identifier and the plaintext obtained in step 6 to the key utilization means 23, and requests the key utilization means 23 to encrypt the plaintext with the encryption algorithm having the new identifier. Next, a list including a set of
[serial number, plaintext, ciphertext]
is newly created.

Step 8. Creating ciphertext table:

The application response means 22 requests the database control means 12 to create a ciphertext table storing a list including a set of
[serial number, ciphertext]
to create a ciphertext table (see the storage format in FIGS. 7D to 7F).

Step 9. Updating ciphertext table information table:

To add a new table in the encryption table information table (see FIG. 7B), the application response means 22 requests the database control means 12 to add a set of
[target table name, target column name, new encryption algorithm identifier, ciphertext table name created in step 8].

Step 10. Deleting ciphertext table not satisfying specified confidentiality level:

Regarding the encryption algorithm identifiers only included in step 1, the application response means 22 requests the database control means 12 to refer to the ciphertext table information table (see FIG. 7B), determine a corresponding ciphertext table name, and delete the corresponding ciphertext table and the corresponding part in the ciphertext table information table (a row (an entry) including a ciphertext table name as the deletion target) from the database 11. Through this operation, regarding the column data for which change of the confidentiality level is specified, the column data encrypted with an encryption algorithm having a lower confidentiality level than a newly specified confidentiality level is deleted from the database 11.

If the currently set confidentiality level is set to be lower via security setting means 26, likewise processing is executed. If data encrypted with an encryption algorithm corresponding to the same confidentiality level as a newly specified confidentiality level exists, the processing for executing re-encryption with an encryption algorithm corresponding to the newly specified confidentiality level and for creating a ciphertext table is not executed.

<Data Addition Procession>

Figure 16:
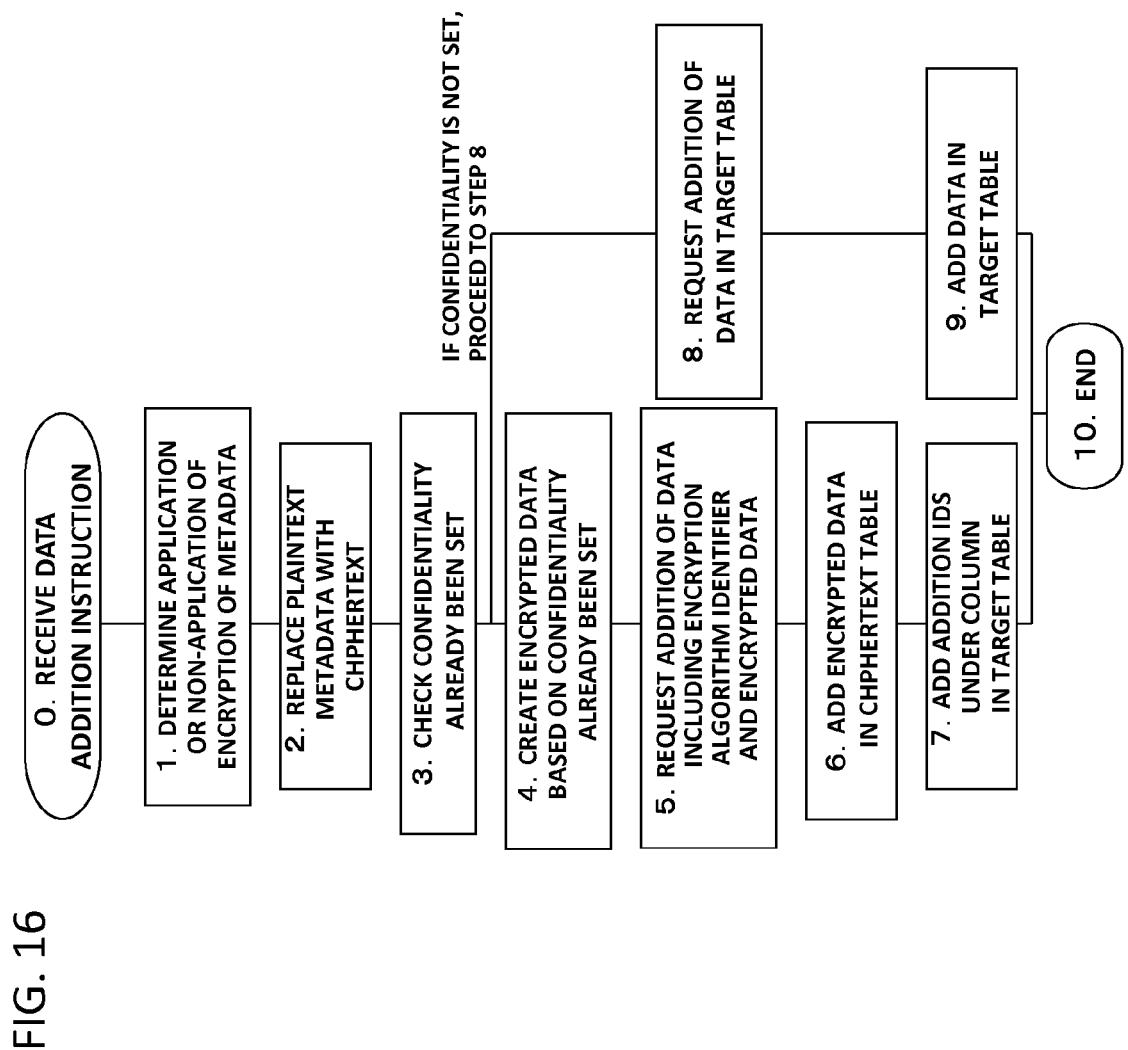
FIG. 16 is a flowchart illustrating processing executed by the application response means according to the exemplary embodiment of the present invention to add data in a table already created in a database.

Next, a processing procedure for adding new column data in the database will be described. FIG. 16 is a flowchart illustrating processing executed by the application response means 22 for adding data in a table already been created in the database 11.

Step 0. Receiving data addition instruction:

The application response means 22 recognizes that a database operation command inputted from the database utilization application 21 is a data addition instruction, such as the following SQL INSERT statement
(INSERT INTO (column name 1, column name 2, . . . )
VALUES (value 1, value 2, . . . ).

Step 1. Determining whether or not metadata is encrypted:

The application response means 22 refers to the security setting information storage unit 14 in the database system 10 or the security setting information temporary storage unit 25 and determines whether the addition target table name and column name are encrypted in the database 11.

Step 2. Replacing plaintext metadata with ciphertext:

If the table name and column name specified by the database operation command corresponding to the data addition instruction are encrypted, the application response means 22 gets the ciphertext table name and plaintext column name corresponding to the plaintext table name and column name under the columns "Decrypted Table Name" and "Decrypted Column Name" in the security setting information temporary storage unit 25 and replaces the plaintext table name and plaintext column name included in the data addition instruction such as the above INSERT statement with the ciphertext table name and ciphertext column name obtained.

The application response means 22 refers to the security setting information storage unit 14 or the security setting information temporary storage unit 25 and gets a column data confidentiality level and an encryption algorithm identifier corresponding to the addition target column.

Step 3. Checking confidentiality already been set:

If the confidentiality level of the column data corresponding to the table name and column name represents Null in the security setting information storage unit 14 or the security setting information temporary storage unit 25 (if a confidentiality level is not set), the application response means 22 executes step 8. If a column data confidentiality level is set, the application response means 22 executes step 4.

Step 4. Creating encrypted data based on confidentiality already been set:

If a column data confidentiality level and an encryption algorithm identifier are set, regarding all the encryption algorithm identifiers set, the application response means 22 sends the plaintext data to be added and the encryption algorithm identifiers to the key utilization means 23, encrypts the plaintext data with the set encryption algorithm, and creates a list including a set of
[encryption algorithm identifier, encrypted data].

Step 5. Requesting addition of data including encryption algorithm identifier and encrypted data:

The application response means 22 sends the addition target table name and column name and [encryption algorithm identifier, encrypted data] obtained in step 4 to the database control means 12 to request addition of the data in the database 11.

Step 6. Adding encrypted data in ciphertext table:

The database control means 12 gets the maximum value of the serial numbers stored in the addition target column and sets a value obtained by adding 1 to the maximum value of the serial numbers as an addition ID start number IDx.

The database control means 12 refers to the ciphertext table information table (FIG. 7B) for all sets of [encryption algorithm identifier, encrypted data] obtained in step 4 and gets a ciphertext table name corresponding to an encryption algorithm identifier specified by the addition target table and column.

Next, the database control means 12 adds a set of [addition ID, encrypted data] in the ciphertext table obtained. Referring to FIGS. 7D to 7F and the like, the ciphertext table stores pair information about an ID and associated encrypted data. Thus, [addition ID, encrypted data] is added to the last row in the ciphertext table. If a plurality of data is added, the addition IDs are sequentially incremented from the start number IDx, such as IDx+1, IDx+2, and so on.

Step 7. Adding addition IDs in entries under column in target table:

In the corresponding entries under the column in the addition target table, the addition IDs obtained in step 6 are added as column data. For example, the addition IDs are added after the last row in the column in the table (after encryption) in FIG. 7C. If the number of data to be added is N, IDx, IDx+1, IDx+2, . . . , IDx+N−1 are added after the last row in the column in the table (after encryption) in FIG. 7C and the maximum ID value is updated to IDx+N−1.

Steps 4 to 7 correspond to data addition processing executed when a confidentiality level is set.

In step 3, if a confidentiality level is not set, the following processing is executed.

Step 8. Requesting addition of data in target table:

The application response means 22 sends an instruction for adding data, obtained after the addition target table name and column name are encrypted to ciphertext in step 2, to the database control means 12, so as to request the database control means 12 to add the data in the database 11.

Step 9. Adding data in target table:

The database control means 12 adds the data in the database 11 in accordance with the data addition instruction sent from the application response means 22.

A processing procedure for setting application or non-application of encryption and for setting a confidentiality level as security information settings and a processing procedure for adding column data as a database operation example according to the present exemplary embodiment have thus been described with reference to the respective flowcharts. Hereinafter, some of the representative processing in the system according to the present exemplary embodiment will be described (since the processing does not basically involve any decision and the like, no flowchart is used).

<Initial Operation after Application Response Means is Started>

An initial operation executed after the application response means 22 is started will be described with reference to FIG. 1. In an initial operation of the application response means, to improve the efficiency of the subsequent processing, as an initial operation after the application response means is started, processing for reading part of the information stored in the database system 10 out to the user system 20 side and processing for generating auxiliary information is executed.

The application response means 22 reads the contents in the security setting information storage unit 14 in the database system 10 via the database control means 12 and stores the read contents in the security setting information temporary storage unit 25.

If metadata (table and column names) in the database 11 is encrypted, the application response means 22 decrypts the encrypted metadata via the key utilization means 23 and stores the decrypted metadata in the corresponding columns under "Decrypted Table Name" and "Decrypted Column Name" in the security setting information temporary storage unit 25. In addition, the application response means 22 may read the contents in the cryptographic protocol information storage unit 13 in the database system 10 out to the user system 20 side and store the read contents in a storage unit during an initial operation of the application response means 22.

<Processing for Operating Metadata>

Operations for adding a new table and changing an existing table name and column name in the database 11 (operating metadata) will be described. When a new table is added in the database 11, as described above, security information is set via the security setting means 26.

Upon reception of a database operation command for adding a table from the database utilization application 21, the application response means 22 notifies the security setting means 26 of this command. The security setting means 26 displays the content of the table addition command on a screen and requests the database user to input security setting information about the table to be added (encryption or non-encryption of a table name and of a column name and a column data confidentiality level). The security setting means 26 sends the security setting information inputted by the database user to the application response means 22.

The application response means 22 encrypts the table name and the column name in accordance with the security setting information sent from the security setting means 26, sends the database operation command for adding a table to the database control means 12, and creates a table in the database 11.

The application response means 22 sends the security setting information to the database control means 12 and stores the security setting information in the security setting information storage unit 14. The application response means 22 stores the same security setting information as the security setting information stored in the security setting information storage unit 14 in the security setting information temporary storage unit 25. If the table name and the column name have been encrypted, the table name and the column name before encryption are stored in the respective columns under the columns "Decrypted Table Name" and "Decrypted Column Name".

<Change of Table Name and Column Name>

Processing for changing setting contents of metadata such as a table name and a column name of a table stored in the database 11 (change of encryption to "Applied" and change of encryption to "NULL") has already been described with reference to FIGS. 12 and 13. Hereinafter, processing for changing a table name and a column name will be described.

To change an existing table name and column name stored in the database 11, different processing needs to be executed depending on whether the table name and the column name have been encrypted.

Upon reception of a database operation command for changing a table name and a column name, the application response means 22 searches the security setting information temporary storage unit 25 and determines whether the settings of encryption of the change target table name and column name represent "Applied".

If the settings of encryption represent "NULL", the application response means 22 sends the database operation command as a normal database operation to the database control means 12 and causes the database control means 12 to execute a corresponding database operation. In addition, the table name and the column name stored in the security setting information storage unit 14 and the security setting information temporary storage unit 25 are also changed. If the settings of encryption represent "Applied", the following processing is executed.

Step 1: The application response means 22 uses the key utilization means 23 to encrypt the specified change-target plaintext table name and column name and, regarding the changed table name and column name, creates a set of [plaintext table name and column name, ciphertext table name and column name].

Step 2: The application response means 22 refers to the security setting information temporary storage unit 25, searches for the ciphertext table name and column name corresponding to the specified change-target plaintext table name and column name, and determines the ciphertext table name and column name registered in the database 11.

Step 3: The application response means 22 sends a database operation command to the database control means 12 to replace the ciphertext table name and column name identified in step 2 and currently registered in the database 11 with the changed ciphertext table name and column name created in step 1, so as to change the table name and the column name in the database 11.

Step 4: The application response means 22 replaces the ciphertext table name and column name stored in the security setting information storage unit 14 and the security setting information temporary storage unit 25 and identified in step 2 with the ciphertext table name and column name created in step 1. In addition, the application response means 22 replaces the corresponding plaintext table name and column name (decrypted table name and column name) stored in the security setting information temporary storage unit 25 with the specified changed plaintext table name and column name.

<Adding Data in Existing Table>

Addition of data under a column in an existing table already been stored in the database 11 has already been described with reference to FIG. 16. Data to be added is encrypted, and a number (an addition ID) obtained by adding 1 to a current table row number (the maximum value of the serial numbers) is added as data in an entry under a specified column in a specified table. The ciphertext table information table (FIG. 7B) is referred to, and a set of the addition ID and ciphertext is added in a ciphertext table corresponding to an encryption algorithm corresponding to the data to be added (if a plurality of encryption algorithms exist, such data is added in a plurality of ciphertext tables corresponding to the plurality of encryption algorithms).

<Changing Data in Existing Table>

Processing executed by the application response means 22 and the database control means 12 when a database operation command inputted from the database utilization application 21 represents change of data will be described. For example, a SQL command for changing data is as follows: UPDATE table name SET <column>=<value>

Step 1: The application response means 22 refers to the security setting information storage unit 14 (or the security setting information temporary storage unit 25) and determines whether the table name and column name corresponding to a supplementary change target are encrypted.

Step 2: If the table name and column name corresponding to the supplementary change target are encrypted, the application response means 22 refers to the security setting information temporary storage unit 25, gets the ciphertext table name and column name on the database 11, and replaces the (plaintext) table name and column name corresponding to the database operation command inputted to the application response means 22 with the obtained ciphertext table name and column name.

Step 3: The application response means 22 refers to the security setting information storage unit 14 (or the security setting information temporary storage unit 25) and determines whether a confidentiality level is set to the change target column data.

Step 4: If the column data confidentiality level corresponding to the table name and the column name in the security setting information storage unit 14 (or the security setting information temporary storage unit 25) is Null (a confidentiality level is not set), the application response means 22 sends a database operation command that has only replaced the above table name and column name to the database control means 12 and causes the database control means 12 to execute the change.

If a column data confidentiality level corresponding to the table name and the column name in the security setting information storage unit 14 (or the security setting information temporary storage unit 25) is set, the following processing is executed.

Step 5: The application response means 22 refers to the security setting information storage unit 14 (or the security setting information temporary storage unit 25) and gets all the encryption algorithm identifiers of the target column.

Step 6: The application response means 22 encrypts the change target plaintext data with all the encryption algorithms corresponding to the obtained identifiers.

Step 7: The application response means 22 sends information about the change target table name and column name, specification of the change target rows, and all the created sets of
[encryption algorithm identifier, ciphertext]
to the database control means 12.

Step 8: The database control means 12 refers to the change target table and column and gets the serial numbers stored in the change target rows.

Step 9: The database control means 12 refers to the ciphertext table information, identifies a ciphertext table per encryption algorithm, and rewrites the encrypted data in the rows corresponding to the serial numbers obtained in step 4 with the encrypted data received in step 7.

<Deleting Data from Existing Table>

Processing executed by the application response means 22 and the database control means 12 when a database operation command inputted from the database utilization application 21 represents deletion of data will be described.

Step 1: The application response means 22 refers to the security setting information storage unit 14 (or the security setting information temporary storage unit 25) and determines whether the table name of the operation target is encrypted.

Step 2: If the operation target table name is not encrypted, the application response means 22 sends the database operation command as a normal operation command to the database control means 12.

Step 3: If the operation target table name is encrypted, the application response means 22 refers to the security setting information temporary storage unit 25, gets a corresponding ciphertext table name on the database 11, replaces the operation target table name with the obtained ciphertext table name, and sends the obtained ciphertext table name to the database control means 12.

Step 4: The database control means 12 deletes the data in accordance with the database operation command from the application response means 22. In this step, whether a column in which data is encrypted exists in the deletion target table is determined. If such column in which encryption is executed exists, data in the corresponding ciphertext table is also deleted.

<Searching for and Computing Data in Existing Table>

Next, processing executed when a database operation command represents searching for and calculating data in an existing table will be described.

Step 1: The application response means 22 refers to the security setting information storage unit 14 (or the security setting information temporary storage unit 25) and determines whether the table name and the column name of the operation target are encrypted.

Step 2: If the operation target table name and column name are encrypted, the application response means 22 refers to the security setting information temporary storage unit 25, gets a corresponding ciphertext table name and column name on the database 11, and replaces the plaintext table name and column name corresponding to the database operation command inputted from the application response means 22 with the obtained ciphertext table name and column name.

Step 3: The application response means 22 refers to the security setting information storage unit 14 or the security setting information temporary storage unit 25 and determines whether a column data confidentiality level is set to the operation target column data.

If a confidentiality level is not set to the operation target column (if column data is not encrypted), the following steps 4 to 6 are executed.

Step 4: The application response means 22 sends the database operation command (search and computation) that has replaced the table name and column name to the database control means 12.

Step 5: The database control means 12 executes the database operation (search and computation) received from the application response means 22 and sends an execution result to the application response means 22.

Step 6: If the table name and column name included in the database operation command (search and computation) have been replaced with ciphertext, the database control means 12 replaces the table name and column name included in the execution result of the database operation with the corresponding plaintext table name and column name again and sends the obtained data to the application response means 22.

Next, processing for searching for and calculating data in an existing table executed when a column data confidentiality level is set to the operation target column will be described.

Step 7: The application response means 22 refers to the security setting information storage unit 14 and gets an encryption algorithm identifier used for encryption of the operation target column.

Step 8: The application response means 22 refers to the cryptographic protocol information storage unit 13 and gets a cryptographic protocol identifier (see FIG. 5) corresponding to a triplet [processing content, confidentiality set in operation target column, encryption algorithm identifier used for encryption of operation target column].

Step 9: [cryptographic protocol identifier, operation target column, processing content] is inputted to the cryptographic protocol processing execution unit 222 in the application response means 22.

Step 10: Based on the inputted cryptographic protocol identifier, the cryptographic protocol processing execution unit 222 in the application response means 22 communicates with the database control means 12, executes the database operation, and obtains an execution result. The specific content of the cryptographic protocol processing differs depending on the cryptographic protocol.

Step 11: If the table name and the column name included in the database operation command have been replaced, the database control means 12 replaces the ciphertext table name and column name included in the obtained execution result with the plaintext table name and column name again and sends the execution result to the application.

<Operation Example of Processing for Setting Confidentiality to Data>

Next, processing for setting a column "Employee Table" and a column "Work Location" to a confidentiality level "Middle" according to the present exemplary embodiment will be described.

Step 1. Selecting encryption algorithm:

The application response means 22 selects an encryption algorithm corresponding to a confidentiality level specified by the user via the security setting means 26. Referring to FIG. 17, the application response means 22 refers to the cryptographic protocol information storage unit 13 and gets a list of encryption algorithm identifiers corresponding to the confidentiality level "Middle" ("SE1", "AES", "HE1"). The application response means 22 selects one identifier from the list of encryption algorithm identifiers ("SE1", "AES", "HE1"). In this case, the application response means 22 puts weight on efficiency in creation of ciphertext and selects "AES".

Step 2. Changing security setting information storage unit:

Referring to FIG. 18, the security setting information operation unit 124 in the database system 10 refers to the row storing information corresponding to the table name "Employee Table" and the column name "Work Location" in the security setting information storage unit 14 and changes the corresponding entry under "Encryption of Column Data" from "NULL" to "Applied", the corresponding entry under "Confidentiality of Column Data" from "NULL" to "Middle", and the corresponding entry under "Column Data Encryption Algorithm Identifier" from "NULL" to "AES".

Step 3. Changing security setting information temporary storage unit 25:

The security setting information operation unit 225 in the application response means 22 refers to the row storing information corresponding to the table name "Employee Table" and the column name "Work Location" in the security setting information temporary storage unit 25 and makes the same changes as those made to the security setting information storage unit 14. Namely, as illustrated in FIG. 19, the security setting information operation unit 225 refers to the row storing information corresponding to the table name "Employee Table" and the column name "Work Location" and changes the corresponding entry under "Encryption of Column Data" from "NULL" to "Applied", the corresponding entry under "Confidentiality of Column Data" from "NULL" to "Middle", and the corresponding entry under "Column Data Encryption Algorithm Identifier" from "NULL" to "AES".

Step 4. Getting target column data:

FIG. 20A illustrates the table "Employee Table". The database control means 12 gets a list of data under the column "Work Location" from the table "Employee Table" and sends the data to the application response means 22. In this step, a main key column uniquely determining a column in the table "Employee Table" is also obtained. In this case, the column "Employee Number" is used as such main key.

Step 5. Encrypting obtained column data:

The application response means 22 causes the key utilization means 23 to encrypt the data under the column "Work Location", associates the encrypted data with the respective original plaintext and employee numbers, and creates a list including serial numbers 1, 2, 3, and so on as illustrated in FIG. 20B. This lest is stored in a storage unit in the application response means 22.

Step 6. Creating ciphertext table:

From the list (FIG. 21A) created in step 5, the application response means 22 sends a list including a set of ciphertext (ciphertext "0x3d8 . . . " of plaintext "Headquarters" and ciphertext "0x962 . . . " of plaintext "Tamagawa") and serial numbers (1, 2, and so on), each set being as a pair, to the database control means 12 and creates and stores a ciphertext table. Referring to FIG. 21B, the ciphertext table name is set to "Encrypted Text_AES_1". The ciphertext table includes combinations of serial numbers and ciphertext, each forming a pair.

Step 7. Updating ciphertext table information table:

Referring to FIG. 21C, the table name "Employee Table", the column name "Work Location", the encryption algorithm "AES", and the ciphertext table name "Encrypted Text_AES_1" are stored in the ciphertext table information table.

Step 8. Replacing plaintext column data:

The list (FIG. 22A) of sets of employee numbers and serial numbers created in step 5 is sent to the database control means 12 and, as illustrated in FIG. 22B, the values under the column "Work Location" in the table "Employee Table" are replaced with the respective serial numbers (1, 2, and so on). When replacement with the serial numbers is completed, the list (FIG. 22A) created in step 5 is deleted. The ciphertext table and the ciphertext table information table in FIGS. 22C and 22D are the same as the ciphertext table and the ciphertext table information table in FIGS. 21B and 21C.

<Average Value Computation>

Next, a computation example for computing an average value of encrypted data stored in the database 11 will be described. FIG. 23 illustrates the security setting information temporary storage unit 25 referred to in this example. Processing for computing an average value of encrypted data under column names "Overtime Hours" in table names "Working Hours Management Table" stored in the database 11 will be described.

In the table names "Working Hours Management Table", the column data confidentiality of the column data under the column "Working Hours" and of the column data under a first column "Overtime Hours" are set to "Middle" and the column data is encrypted by an encryption algorithm having the identifier "AES". In addition, the column data under a second column "Overtime Hours" is encrypted by an encryption algorithm having the identifier "HE1". Except for the information under "Decrypted Table Name" and "Decrypted Column Name", the security setting information storage unit 14 on the database system 10 stores the same information as that stored in the security setting information temporary storage unit 25 in FIG. 23.

FIG. 24A illustrates the content of the main body in the table name "Working Hours Management Table". The serial numbers (IDs) 1, 2, 3, and so on under "Working Hours" and "Overtime Hours" are the serial numbers (IDs) 1, 2, 3, and so on associated with the respective ciphertext in the respective ciphertext tables. FIG. 24C illustrates the ciphertext table "Encrypted Text_AES_1" storing the encrypted data under "Working Hours" and FIGS. 24D and 24E illustrate the ciphertext tables "Encrypted Text_AES_2" and "Encrypted Text_HE1_1" storing the encrypted data under "Overtime Hours". FIG. 24B illustrates the ciphertext table information table defining a correspondence relationship among these tables.

FIG. 25 illustrates the cryptographic protocol information storage unit 13. An encryption algorithm identifier OPE1 represents an order preserving symmetric encryption algorithm (common key method). "HE1" represents a homomorphic encryption and "SE1" represents a searchable encryption.

If a database operation command inputted from the database utilization application 21 represents an average value computation operation (for example, a SQL statement: SELECT AVG (column name) FROM table name), the application response means 22 determines encryption or non-encryption of metadata (table and column names). The application response means 22 refers to the security setting information temporary storage unit 25 in FIG. 23 and gets information corresponding to the column names "Overtime Hours" in the table names "Working Hours Management Table". The application response means 22 refers to the corresponding entries under "Encryption of Table Name" and "Encryption of Column Name" and determines that "NULL" is set in both of the entries. In such this, the application response means 22 does not replace the metadata.

Next, the application response means 22 refers to the corresponding entries under "Confidentiality of Column Data" corresponding to the column names "Overtime Hours" in the table names "Working Hours Management Table" in the security setting information temporary storage unit 25 in FIG. 23 and determines that the column data confidentiality levels are set to "Middle". Thus, processing involving cryptographic protocol processing is executed.

The application response means 22 refers to the corresponding entries under "Column Data Encryption Algorithm Identifier" in the table name "Working Hours Management Table" in the security setting information temporary storage unit 25 in FIG. 23 and gets encryption algorithm identifiers "AES" and "HE1" used for encryption.

The application response means 22 refers to the cryptographic protocol information storage unit 13 (see FIG. 25) and searches for a cryptographic protocol identifier(s) corresponding to the confidentiality level "Middle" and the processing content "Average", as to each of the encryption algorithms "AES" and "HE1".

As a result of the search, the application response means 22 gets a cryptographic protocol identifier "HE1_AVG_M", as to the encryption algorithm "HE1".

The following information is inputted to the cryptographic protocol processing execution unit 222 in the application response means 22:
cryptographic protocol identifier: "HE1_AVG_M",
table name: "Working Hours Management Table",
column name: "Overtime Hours",
encryption algorithm: "HE1", and
processing content: "Average".

Based on the inputted cryptographic protocol identifier, the cryptographic protocol processing execution unit 222 communicates with the cryptographic protocol processing execution unit 122 in the database control means 12 and executes cryptographic protocol processing. While specific operations vary depending on the cryptographic protocol or implementation thereof (an operation example will be described below while the present invention is not particularly limited thereto). An execution result obtained by the cryptographic protocol processing execution unit 222 is sent to the database utilization application 21.

The cryptographic protocol processing execution unit 222 in the user system 20 sends four items of information, namely, the operation target table name "Working Hours Management Table", the column name "Overtime Hours", the encryption algorithm identifier "HE1", and the cryptographic protocol identifier "HE1_AVG_M", to the cryptographic protocol processing execution unit 122 in the database control means 12.

The cryptographic protocol processing execution unit 122 operates as follows in accordance with a processing procedure specified by the received cryptographic protocol identifier "HE1_AVG_M".

The cryptographic protocol processing execution unit 122 refers to the column "Overtime Hours" in the table "Working Hours Management Table" in the ciphertext table information table (FIG. 24B) and gets the table name "Encrypted Text_HE1_1" in which data encrypted by the encryption algorithm "HE1" is stored.

Next, the cryptographic protocol processing execution unit 122 gets all the encrypted data and the number of data items stored under the column "Encrypted Text" in "Encrypted Text_HE1_1".

The cryptographic protocol processing execution unit 122 calculates the sum of ciphertext representing the sum of plaintext, without decrypting the encrypted data obtained. In additive homomorphic encryption such as the Paillier cryptosystem, for example, if there are ciphertext $E(m1)$ of plaintext m1 and ciphertext $E(m2)$ of plaintext m2, ciphertext $E(m1+m2)$ of m1+m2 can be represented by $E(m1)+E(m2)=E(m1+m2)$. Thus, the sum of ciphertext $E(\Sigma mi)$ can be computed by $\Sigma E(mi)$.

The cryptographic protocol processing execution unit 122 in the database control means 12 sends the obtained sum of ciphertext and the number of data to the cryptographic protocol processing execution unit 222 (see FIG. 8) in the user system 20 via the processing and communication control unit 125 (see FIG. 3). The above RSA encryption and Elgamall encryption are multiplicative homomorphic encryption. Thus, an encryption algorithm corresponding to a computation operation (processing content identifier) is set. For example, in the example of the cryptographic protocol information storage unit 13 in FIG. 25, the homomorphic encryption algorithm HE1 (in this case, HE1 is the Paillier crypto system or the like) is set for the processing content identifier "Average".

The cryptographic protocol processing execution unit 222 in the user system 20 sends the sum of ciphertext received from the database control means 12 and the encryption algorithm identifier "HE1" to the key utilization means 23, decrypts the sum of ciphertext, and gets the sum of plaintext. Next, the cryptographic protocol processing execution unit 222 calculates an average value (plaintext) by dividing the sum (plaintext) by the number of data (plaintext). The cryptographic protocol processing execution unit 222 sends the computed average value to the database utilization application 21 that has issued the database operation command (average value).

Other than the above case of computing an average value, if computation of a part of a complex arithmetic computation such as addition or multiplication can be executed on ciphertext as is in ciphertext by using an additive homomorphic encryption algorithm or an multiplicative homomorphic encryption algorithm, the cryptographic protocol processing execution unit 122 in the database control means 12 sends a result (ciphertext) of computation on ciphertext to the cryptographic protocol processing execution unit 222 in the application response means 22. Next, the application response means 22 uses the key utilization means 23 to decrypt the encrypted data as the processing result into plaintext, executes the remaining computation of the complex arithmetic computation in plaintext, and sends the computation result to the database utilization application 21. With this configuration, the processing efficiency can be improved. In addition, in the database control means 12, if the computation corresponding to a database operation command involves a computation other than addition or multiplication (for example, decryption computation involving addition, subtraction, multiplication, division, etc., magnitude comparison computation, logic operation and so forth) and if processing cannot be executed as is in ciphertext, the computation target data in the database 11 as is in ciphertext is sent to the application response means 22. The application response means 22 uses the key utilization means 23 to decrypt the encrypted data, executes the computation on the plaintext data, and sends the computation result to the database utilization application 21. With this configuration, arbitrary computations can be executed.

In the above exemplary embodiments, SQL commands are used as examples of the database operation commands.

However, of course, the database operation commands are not limited to the SQL commands.

At least part of the above exemplary embodiments may be summarized as the following Supplementary Notes, though not limited thereto.

(Supplementary Note 1)

A database apparatus, comprising:

control means for executing data access control on a database;

the control means receiving a database operation command from a user apparatus, the control means comprising, regarding data and/or metadata to be handled associated with the database operation command, means for executing database operation or computation on encrypted data and/or encrypted metadata as is in ciphertext; and means for executing database operation or computation on plaintext data and/or plaintext metadata, the control means sending a processing result to the user apparatus.

(Supplementary Note 2)

The database apparatus according to Supplementary Note 1, wherein when the control means receives the database operation command from the user apparatus, when such a condition is med that operation target data encrypted and stored in the database is encrypted by an encryption algorithm allowing operation or computation on encrypted data to be executed as is in ciphertext and that operation or computation of the database operation command is operation or computation that can be executed on ciphertext, the control means performs operation or computation on the operation target data in ciphertext, outputs a processing result in ciphertext, and sends the processing result to the user apparatus.

(Supplementary Note 3)

The database apparatus according to Supplementary Note 1 or 2, wherein the control means sends a computation result of partial computation of a computation of the database operation command to the user apparatus in ciphertext, wherein if the user apparatus finds that further partial computation needs to executed in plaintext, the user apparatus executes the partial computation on data obtained by decrypting the encrypted data into plaintext, wherein if the computation of the database operation command still includes partial computation in ciphertext and if the partial computation is allowed to be executed on ciphertext as is in ciphertext, the user apparatus sends ciphertext obtained by encrypting the result of the partial computation in plaintext to the control means, and wherein by using the encrypted data sent from the user apparatus, the control means executes the remaining partial computation of the computation of the database operation command in ciphertext and sends the computation result of the partial computation to the user apparatus in ciphertext.

(Supplementary Note 4)

The database apparatus according to any one of Supplementary Note 1 to 3, comprising:

a first storage unit storing information about encryption and non-encryption of the metadata including table and column names stored in the database, information on whether or not data stored in the database is encrypted, confidentiality information representing extent of data security, and encryption algorithm identification information corresponding to the confidentiality information, and a second storage unit at least storing cryptographic protocol identification information associating processing content in the database operation command, confidentiality information, and encryption algorithm with each other.

(Supplementary Note 5)

The database apparatus according to Supplementary Note 4, wherein the database serves as at least one of the first and second storage units and stores the information stored in the first and/or second storage unit as a table in the database.

(Supplementary Note 6)

The database apparatus according to Supplementary Note 4 or 5, wherein the control means comprises a cryptographic protocol processing execution unit that executes processing corresponding to the database operation command on data encrypted by an encryption algorithm corresponding to the confidentiality information in ciphertext, based on cryptographic protocol identification information stored in the second storage unit.

(Supplementary Note 7)

The database apparatus according to any one of Supplementary Note 1 to 6, wherein regarding the computation operation corresponding to the database operation command, if the computation operation corresponds to homomorphic computation and the encryption algorithm corresponds to homomorphic encryption, the control means executes the computation operation on data in ciphertext in the database and sends the computation result in ciphertext to the user apparatus.

(Supplementary Note 8)

The database apparatus according to any one of Supplementary Note 1 to 6, wherein regarding the computation of the database operation command, if the operation target data stored in the database in ciphertext is encrypted by an encryption algorithm not allowing the computation to be executed on encrypted data, the control means sends the operation target encrypted data to the user apparatus, and wherein the user apparatus decrypts the encrypted data into plaintext and executes the computation.

(Supplementary Note 9)

The database apparatus according to any one of Supplementary Note 1 to 8, wherein if column data in a table in the database is encrypted, the user apparatus encrypts the column data with an encryption algorithm corresponding to confidentiality information set to the column data and sends the encrypted data to the control means, wherein the control means creates a ciphertext table including a set of a serial number and ciphertext of the column data, and wherein to manage the ciphertext table, the database apparatus comprises a ciphertext table information table including a set of a table name, a column name, an encryption algorithm, and a ciphertext table name.

(Supplementary Note 10)

The database apparatus according to any one of Supplementary Note 1 to 9, wherein the control means comprises an encryption calculation unit encrypting metadata and/or data by using a public key sent from the user apparatus.

(Supplementary Note 11)

The database apparatus according to Supplementary Note 10, wherein if column data in a table in the database is encrypted, the database apparatus reads the column data from the database, gets public key information from the user apparatus, and uses the encryption calculation unit to encrypt the column data, wherein the database apparatus creates a ciphertext table including a set of a serial number and ciphertext of the column data, and wherein to manage the ciphertext table, the database apparatus comprises a ciphertext table information table including a set of a table name, a column name, an encryption algorithm, and a ciphertext table name.

(Supplementary Note 12)

The database apparatus according to Supplementary Note 9 or 11, wherein when the control means receives a database operation command to add column data from the user apparatus, the control means adds a pair of an updated serial number and ciphertext in the ciphertext table in the database.

(Supplementary Note 13)

The database apparatus according to Supplementary Note 1, wherein when receiving an instruction to change confidentiality information about data stored in the database, the control means sends encrypted data stored in the database to the user apparatus, wherein the user apparatus decrypts the encrypted data into plaintext and encrypts the plaintext again with an encryption algorithm corresponding to the changed confidentiality information, and wherein the control means receives the re-encrypted data from the user apparatus and stores the re-encrypted data in the database.

(Supplementary Note 14)

A database control method, comprising:

receiving a database operation command from a user apparatus when data access control is executed on a database, executing at least one of:

database operation or computation on encrypted data and/or encrypted metadata as is in ciphertext, and database operation or computation on plaintext data and/or plaintext metadata, regarding data and/or metadata to be handled associated with the database operation command, and sending a processing result to the user apparatus.

(Supplementary Note 15)

The database control method according to Supplementary Note 14, comprising upon reception of a database operation command from the user apparatus, if such a condition is met that operation target data encrypted and stored in the database is encrypted by an encryption algorithm allowing operation or computation on encrypted data to be executed as is in ciphertext and that operation or computation of the database operation command is operation or computation that can be executed on ciphertext, performing operation or computation on the operation target data in ciphertext and sending a processing result in ciphertext to the user apparatus.

(Supplementary Note 16)

The database control method according to Supplementary Note 14 or 15, comprising storing and managing, in a first storage unit, information on whether or not the metadata including table and column names stored in the database is encrypted, information on whether or not data stored in the database is encrypted, confidentiality information representing extent of data security, and encryption algorithm identification information corresponding to the confidentiality information; and storing and managing in a second storage unit, at least cryptographic protocol identification information associating processing content in the database operation command, confidentiality information and encryption algorithm with each other.

(Supplementary Note 17)

The database control method according to Supplementary Note 16, comprising executing processing corresponding to the database operation command on data encrypted by an encryption algorithm corresponding to the confidentiality information in ciphertext, based on cryptographic protocol identification information stored in the second storage unit.

(Supplementary Note 18)

The database control method according to one of Supplementary Note 14 to 17, comprising regarding the computation operation corresponding to the database operation command, if the computation operation corresponds to homomorphic computation and the encryption algorithm corresponds to homomorphic encryption, executing the computation operation on data in ciphertext in the database and sending the computation result in ciphertext to the user apparatus.

(Supplementary Note 19)

The database control method according to one of Supplementary Note 14 to 17, comprising regarding the computation of the database operation command, if the operation target data stored in the database in ciphertext is encrypted by an encryption algorithm not allowing the computation to be executed on encrypted data, and sending the encrypted data in the database to the user apparatus, and the user apparatus decrypting the encrypted data into plaintext and executing the computation on the plaintext.

(Supplementary Note 20)

The database control method according to one of Supplementary Note 14 to 19, comprising when column data in a table in the database is encrypted, the user apparatus encrypting the column data with an encryption algorithm corresponding to confidentiality information set to the column data and sending the encrypted data to the database apparatus, the database apparatus creating a ciphertext table including a set of a serial number and ciphertext of the column data, and managing the ciphertext table in a ciphertext table information table including a set of a table name, a column name, an encryption algorithm, and a ciphertext table name.

(Supplementary Note 21)

The database control method according to one of Supplementary Note 14 to 19, comprising when column data in a table in the database is encrypted, the column data is read from the database, getting public key information from the user apparatus, and encrypting the column data, creating a ciphertext table including a set of a serial number and ciphertext of the column data, and to manage the ciphertext table, providing a ciphertext table information table including a set of a table name, a column name, an encryption algorithm, and a ciphertext table name.

(Supplementary Note 22)

The database control method according to Supplementary Note 20 or 21, comprising when a database operation command to add column data is received from the user apparatus, adding a pair of an updated serial number and ciphertext in the ciphertext table in the database.

(Supplementary Note 23)

The database control method according to Supplementary Note 14, comprising when receiving an instruction to change confidentiality information about data stored in the database, the database apparatus sending encrypted data stored in the database to the user apparatus, the user apparatus decrypting the encrypted data into plaintext and encrypting the plaintext again with an encryption algorithm corresponding to the changed confidentiality information, and the database apparatus receiving the re-encrypted data from the user apparatus and storing the re-encrypted data in the database.

(Supplementary Note 24)

A program, causing a computer which is included in a database control apparatus that is connected to a user apparatus for communication and that executes data access control on a database to execute processing comprising:

receiving a database operation command from the user apparatus, executing at least one of: database operation or computation on encrypted data and/or encrypted metadata as is in ciphertext, and database operation or computation on plaintext data and/or metadata, regarding data and/or metadata to be handled associated with the database operation command, and sending a processing result of the database operation to the user apparatus.

(Supplementary Note 25)

The program according to Supplementary Note 24, wherein when a database operation command is received from the user apparatus, when such a condition is met that operation target data encrypted and stored in the database is encrypted by an encryption algorithm allowing operation or computation on encrypted data to be executed as is in ciphertext and that operation or computation of the database operation command is operation or computation that can be executed on ciphertext, the program causes the computer to execute processing to perform operation or computation on the operation target data in ciphertext and to send a processing result in ciphertext to the user apparatus.

(Supplementary Note 26)

The program according to Supplementary Note 24 or 25, wherein the program causes the computer to execute processing to send a computation result of partial computation of a computation of the database operation command to the user apparatus in ciphertext, wherein when the user apparatus finds that further partial computation needs to executed in plaintext, the user apparatus executing the partial computation on data obtained by decrypting the encrypted data into plaintext, wherein when the computation of the database operation command still includes partial computation in ciphertext and if the partial computation is allowed to be executed on ciphertext as is in ciphertext, the user apparatus sends ciphertext obtained by encrypting the result of the partial computation in plaintext to the database control apparatus, the program causing the computer to execute processing comprising executing the remaining partial computation of the computation of the database operation command in ciphertext by using the encrypted data sent from the user apparatus and sending the computation result of the partial computation to the user apparatus in ciphertext.

(Supplementary Note 27)

The program according to any one of Supplementary Note 24 to 26, causing the computer to execute processing comprising:

storing information about encryption and non-encryption of the metadata including table and column names stored in the database, information on whether or not data stored in the database is encrypted, confidentiality information representing extent of data security, and encryption algorithm identification information corresponding to the confidentiality information in a first storage unit, and storing cryptographic protocol identification information associating processing content in the database operation command, confidentiality information, and encryption algorithm with each other in a second storage unit.

(Supplementary Note 28)

The program according to Supplementary Note 27, wherein the database serves as at least one of the first and second storage units, and wherein the program causes the computer to execute processing for storing the information stored in the first and/or second storage unit as a table in the database.

(Supplementary Note 29)

The program according to Supplementary Note 27 or 28, wherein the program causes the computer to execute cryptographic protocol processing that executes processing corresponding to the database operation command on data encrypted by an encryption algorithm corresponding to the confidentiality information in ciphertext, based on cryptographic protocol identification information stored in the second storage unit.

(Supplementary Note 30)

The program according to any one of Supplementary Note 24 to 29, wherein regarding the computation operation corresponding to the database operation command, if the computation operation corresponds to homomorphic computation and the encryption algorithm corresponds to homomorphic encryption, the program causes the computer to execute processing for executing the computation operation on data in ciphertext in the database and sending the computation result in ciphertext to the user apparatus.

(Supplementary Note 31)

The program according to any one of Supplementary Note 24 to 29, wherein regarding the computation of the database operation command, if the operation target data stored in the database in ciphertext is encrypted by an encryption algorithm not allowing the computation to be executed on encrypted data, the program causes the computer to execute processing for sending the operation target encrypted data to the user apparatus, and wherein the user apparatus decrypts the encrypted data into plaintext and executes the computation.

(Supplementary Note 32)

The program according to any one of Supplementary Note 24 to 31, wherein if column data in a table in the database is encrypted, the user apparatus encrypts the column data with an encryption algorithm corresponding to confidentiality information set to the column data and sends the encrypted data to the database control apparatus, wherein the program causes the computer to execute processing for creating a ciphertext table including a set of a serial number and ciphertext of the column data, and wherein the program causes the computer to execute processing for managing the ciphertext table by using a ciphertext table information table including a set of a table name, a column name, an encryption algorithm, and a ciphertext table name.

(Supplementary Note 33)

The program according to any one of Supplementary Note 24 to 32, wherein the program causes the computer to execute encryption calculation processing for encrypting metadata and/or data by using a public key sent from the user apparatus.

(Supplementary Note 34)

The program according to Supplementary Note 33, wherein the program causes the computer to execute processing comprising:

reading, if column data in a table in the database is encrypted, the column data from the database, acquiring public key information from the user apparatus, and encrypting the column data, creating a ciphertext table including a set of a serial number and ciphertext of the column data, and managing the ciphertext table by using a ciphertext table information table including a set of a table name, a column name, an encryption algorithm, and a ciphertext table name.

(Supplementary Note 35)

The program according to Supplementary Note 32 or 34, wherein the program causes the computer to execute processing for, when a database operation command to add column data is inputted from the user apparatus, adding a pair of an updated serial number and ciphertext in the ciphertext table in the database.

(Supplementary Note 36)

The program according to Supplementary Note 23, wherein the program causes the computer to execute processing for, when receiving an instruction to change confidentiality information about data stored in the database, sending encrypted data stored in the database to the user apparatus, causing the user apparatus side to decrypt the encrypted data into plaintext and encrypt the plaintext again with an encryption algorithm corresponding to the changed confidentiality information, and receiving the re-encrypted data from the user apparatus and storing the re-encrypted data in the database.

The disclosure of each of the above Patent Literatures 1 to 3 and Non-Patent Literature 1 is incorporated herein by reference thereto. Modifications and adjustments of the exemplary embodiment(s) and example(s) are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

The invention claimed is:

1. A database apparatus comprising:
a first storage unit;
a second storage unit; and
a processor which executes a program and thereby comprises:
a control unit configured to execute data access control on a database, the control unit receiving a database operation command from a user apparatus connected with the database apparatus through a network, and the control unit comprising, regarding data and/or metadata to be handled associated with the database operation command:
a first unit configured to execute a database operation or computation on encrypted data and/or encrypted metadata while keeping the encrypted data and/or encrypted metadata as ciphertext; and
a second unit configured to execute the database operation or computation on plaintext data and/or plaintext metadata;

wherein the first storage unit stores: information on whether or not the metadata including table and column names stored in the database are encrypted, information on whether data stored in the database is encrypted, confidentiality information representing extent of data security, and encryption algorithm identification information corresponding ng to the confidentiality information; and wherein the second storage unit stores processing content of the database operation command, confidentiality information and encryption algorithm in association with each other, wherein the control unit sends a processing result of the database operation or computation to the user apparatus, wherein the control unit further comprises an encryption calculation unit performing au encryption at the database apparatus using a public key received from the user apparatus, wherein the control unit sends a composition result of partial computation of the computation of the database operation command in ciphertext to the user apparatus, the user apparatus, when finding that further partial computation needs to be executed on plaintext, decrypts the encrypted data to obtain plaintext data and executes partial computation on plaintext data, in the case wherein further partial computation to be executed in ciphertext remains in the computation of the database operation command, and the partial computation is allowed to be executed on ciphertext while keeping the encrypted data and/or encrypted metadata as ciphertext, the user apparatus sends ciphertext obtained by encrypting the plaintext result of the partial computation to the control unit, and using the ciphertext sent from the user apparatus, the control unit executes a remaining partial computation of the computation of the database operation command on encrypted data while keeping the encrypted data and/or encrypted metadata as ciphertext and sends the computation result of the partial computation in ciphertext to the user apparatus.

2. The database apparatus according to claim 1, wherein, upon reception of the database operation command from the user apparatus, the control unit, when finding that such a condition is met that operation target data encrypted and stored in the database is one that acts encrypted with an encryption algorithm allowing operation or computation on encrypted data to be executed while keeping the encrypted data an of encrypted metadata ciphertext, and that the operation or computation of the database operation command is one that is allowed to be executed on ciphertext while keeping the encrypted data and/or encrypted metadata as ciphertext, performs the operation or computation on the operation target data encrypted, while keeping the encrypted data and/or encrypted metadata as ciphertext, outputs a processing result of the operation or computation in ciphertext to send the processing result to the user apparatus.

3. The database apparatus according to claim 1, wherein at least one of the first and second storage units is the database, and the database stores the information stored in the first and/or second storage unit as a table.

4. The database apparatus according to claim 1, wherein the control unit further comprises
a cryptographic protocol processing execution unit that executes processing corresponding to the database operation command on data encrypted by an encryption algorithm corresponding to the confidentiality information, while keeping the encrypted data and/or encrypted metadata as ciphertext, based on cryptographic protocol identification information stored in the second storage unit.

5. The database apparatus according to claim 1, wherein in a case wherein the computation operation corresponds to homomorphic computation and the encryption algorithm corresponds to homomorphic encryption, the control unit executes the computation operation on encrypted data stored in the database while keeping the encrypted data and/or encrypted metadata as ciphertext, and sends the computation result in ciphertext to the user apparatus.

6. The database apparatus according to claim 1, wherein when finding that the operation target data encrypted and stored in the database in ciphertext is encrypted by an encryption algorithm not allowing the computation to be executed on encrypted data while keeping the encrypted data and/or encrypted metadata as ciphertext, the control unit sends the operation target data encrypted to the user apparatus, and
the user apparatus decrypts the encrypted data into plaintext and executes the computation on the plaintext.

7. The database apparatus according to claim 1, wherein the user apparatus, when encrypting column data in a table in the database, encrypts the column data using an encryption algorithm corresponding to confidentiality information set to the column data and sends the encrypted data to the control unit, and
the control unit creates ciphertext table including set of a serial number and ciphertext of the column data,
the database apparatus further comprising:
a ciphertext table information table to manage the ciphertext table, the ciphertext table information table including a set of a table name, a column name, an encryption algorithm, and a ciphertext table name.

8. The database apparatus according to claim 1, wherein when encrypting column data in a table in the database, encrypts the column data from the database, gets public key information from the user apparatus, and uses the encryption calculation unit to encrypt the column data, and
the database apparatus creates a ciphertext table including a set of a serial number and ciphertext of the column data, and
the database apparatus further comprises:
a ciphertext table information table to manage the ciphertext table, the ciphertext table information table comprising a set of a table name, a column name, an encryption algorithm, and a ciphertext table name.

9. The database apparatus according to claim 7, wherein upon reception of a database operation command to add column data from the user apparatus, the control unit adds a set of an updated serial number and ciphertext in the ciphertext table in the database.

10. The database apparatus according to claim 1, wherein upon reception of an instruction to change confidentiality information about data stored in the database, the control unit sends encrypted data stored in the database to the nicer apparatus,
the user apparatus decrypts the encrypted data into plaintext and encrypts the plaintext again using an encryption algorithm corresponding to the changed confidentiality information, and
the control unit receives the re-encrypted data from the user apparatus and stores the re-encrypted data in the database.

11. A database control method, comprising:
receiving a database operation command from a user apparatus, connected with a database apparatus through a network, when data access control is executed on a database;
performing an encryption at the database apparatus using a public key received from the user apparatus;
executing, regarding data and/or metadata to be handled associated with the database operation command, at least one of:
a database operation or computation on encrypted data and/or encrypted metadata while keeping the encrypted data and/or encrypted metadata as ciphertext;
the database operation or computation on plaintext data and/or plaintext metadata;
sending a processing result of the database operation or computation to the user apparatus;
storing and managing, in a first storage unit:
information on whether the metadata including table and column names stored in the database is encrypted,
information on whether data stored in the database is encrypted,
confidentiality information representing extent of data security, and
encryption algorithm identification information corresponding to the confidentiality information; and
storing and managing in a second storage unit, at least processing content of the database operation command, confidentiality information and encryption algorithm in association with each other,
wherein the database apparatus sends a commutation result of partial computation of the computation of the database operation command in ciphertext to the user apparatus,
the user apparatus, when finding that further partial computation needs to be executed on plaintext, decrypts the encrypted data to obtain plaintext data and executes partial computation on plaintext data,
in the case wherein further partial computation to be executed in ciphertext remains in the computation of the database operation command, and the partial computation is allowed to be executed on ciphertext while keeping the encrypted data and/or encrypted metadata as ciphertext, the user apparatus sends ciphertext obtained by encrypting the plaintext result of the partial computation to the database apparatus, and
using the ciphertext sent from the user apparatus, the database apparatus executes a remaining partial computation of the computation of the database operation command on encrypted data while keeping the encrypted data and/or encrypted metadata as ciphertext and sends the computation result of the partial computation in ciphertext to the user apparatus.

12. The database control method according to claim 11, comprising:
  upon reception of a database operation command from the user apparatus,
    when a condition is met that operation target data encrypted and stored in the database is to be encrypted with an encryption algorithm allowing the operation or computation on encrypted data to be executed while keeping the encrypted data and/or encrypted metadata as ciphertext, and that the operation or computation of the database operation command is allowed to be executed on ciphertext while keeping the encrypted data and/or encrypted metadata as ciphertext;
  performing the operation or computation on the operation target data encrypted, while keeping the encrypted data and/or encrypted metadata as ciphertext; and
  sending a result processed in ciphertext to the user apparatus.

13. The database control method according to claim 11, further comprising
  executing processing corresponding to the database operation command on encrypted data while keeping the encrypted data and/or encrypted metadata as ciphertext, the encrypted data being encrypted by an encryption algorithm corresponding to the confidentiality information, based on cryptographic protocol identification information stored in the second storage unit.

14. The database control method according to claim 11, further comprising
  when the computation operation is a homomorphic computation and the encryption algorithm is a homomorphic encryption, executing the computation operation on encrypted data in the database while keeping the encrypted data and/or encrypted metadata as ciphertext to send the computation result in ciphertext to the user apparatus.

15. The database control method according to claim 11, further comprising:
  when the operation target data stored in the database in ciphertext is encrypted by an encryption algorithm not allowing the computation to be executed on encrypted data while keeping the encrypted data and/or encrypted metadata as ciphertext,
  sending the encrypted data in the database to the user apparatus; and
  the user apparatus decrypting the encrypted data into plaintext to execute the computation on the plaintext.

16. The database control method according to claim 11, further comprising:
  when column data in a table stored in the database is encrypted, the user apparatus encrypting the column data with an encryption algorithm corresponding to confidentiality information set to the column data to send the encrypted data to a database apparatus;
  the database apparatus creating a ciphertext table including a set of a serial number and ciphertext of the column data, and
  managing the ciphertext table by providing a ciphertext table information table comprising a set of a table name, a column name, an encryption algorithm, and a ciphertext table name.

17. The database control method according to claim 11, further comprising:
  when column data in a table in the database is encrypted, reading the column data from the database, acquiring public key information from the user apparatus to encrypt the column data;
  creating a ciphertext table including a set of a serial number and ciphertext of the column data; and
  managing the ciphertext table by providing a ciphertext table information table comprising a set of a table name, a column name, an encryption algorithm, and a ciphertext table name, as a set.

18. The database control method according to claim 16, comprising:
  upon reception of a database operation command to add column data from the user apparatus, adding a set of an updated serial number and ciphertext in the ciphertext table in the database.

19. The database control method according to claim 11, further comprising:
  upon reception of an instruction to change confidentiality information about data stored in the database:
    the database apparatus sending encrypted data stored in the database to the user apparatus;
    the user apparatus decrypting the encrypted data into plaintext and encrypting the plaintext again using an encryption algorithm corresponding to the changed confidentiality information; and
    the database apparatus receiving the re-encrypted data from the user apparatus to store the re-encrypted data in the database.

20. A non-transitory computer readable medium storing a program causing a computer, which is included in a database control apparatus that is connected to a user apparatus for communication and that executes data access control on a database, to execute processing comprising:
  receiving a database operation command from the user apparatus connected with the database control apparatus through a network;
  performing an encryption at the database control apparatus using a public key received from the user apparatus;
  executing, regarding data and/or metadata to be handled associated with the database operation command, at least one of:
    a database operation or computation on encrypted data and/or encrypted metadata while keeping the encrypted data and/or encrypted metadata as ciphertext;
    the database operation or computation on plaintext data and/or metadata;
  sending a processing result of the database operation or computation to the user apparatus;
  storing and managing, in a first storage unit:
    information on whether the metadata including table and column names stored in the database is encrypted,
    information on whether data stored in the database is encrypted,
    confidentiality information representing extent of data security, and
    encryption algorithm identification information corresponding to the confidentiality information; and
  storing and managing in a second storage unit, at least processing content of the database operation command, confidentiality information and encryption algorithm in association with each other,
  wherein the database control apparatus sends a computation result of partial computation of the computation of the database operation command in ciphertext to the user apparatus,
  the user apparatus, when finding that further partial computation needs to be executed on plaintext, decrypts the encrypted data to obtain plaintext data and executes partial computation on plaintext data, in the case wherein further partial computation to be executed in ciphertext remains in the computation of the database operation command, and the partial computation is allowed to be executed on ciphertext while keeping the encrypted data and/or encrypted metadata as ciphertext, the user apparatus sends ciphertext obtained by encrypting the plaintext result of the partial computation to the database control apparatus, and using the ciphertext sent from the user apparatus, the database control apparatus executes a remaining partial computation of the computation of the database operation command on encrypted data while keeping the encrypted data and/or encrypted metadata as ciphertext and sends the computation result of the partial computation in ciphertext to the user apparatus.

21. The non-transitory computer readable medium according to claim 20, wherein the program causes the computer to execute further processing comprising:

upon reception of a database operation command from the user apparatus, when a condition is met that operation target data encrypted and stored in the database is to be encrypted by an encryption algorithm allowing the operation or computation on encrypted data to be executed while keeping the encrypted data and/or encrypted metadata as ciphertext and that operation or computation of the database operation command is allowed to be executed on ciphertext while keeping the encrypted data and/or encrypted metadata as ciphertext;

performing operating or computation on the operation target data encrypted in ciphertext; and sending a result processed in ciphertext to the user apparatus.

* * * * *

UNITED STATES PATENT AND TRADEMARK OFFICE
CERTIFICATE OF CORRECTION

PATENT NO. : 9,600,677 B2  
APPLICATION NO. : 14/357478  
DATED : March 21, 2017  
INVENTOR(S) : Kengo Mori et al.

Page 1 of 2

It is certified that error appears in the above-identified patent and that said Letters Patent is hereby corrected as shown below:

In the Specification

Column 16, Line 46:  
After "unit", insert --14--;

In the Claims

Claim 1, Column 50, Line 16:  
Before "extent", insert --an--;

Claim 1, Column 50, Line 18:  
Before "to", delete "ng";

Claim 1, Column 50, Line 28:  
"au" should be --an--;

Claim 1, Column 50, Line 31:  
"composition" should be --computation--;

Claim 2, Column 50, Line 57:  
"acts" should be --gets--;

Claim 2, Column 50, Line 60:  
"an of" should be --and/or--;

Claim 2, Column 50, Line 60:  
Before "ciphertext", insert --as--;

Claim 2, Column 50, Line 66:  
"encrypted," should be --encrypted--;

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,600,677 B2

Claim 7, Column 51, Line 42:
After "creates", insert --a--;

Claim 7, Column 51, Line 42:
After "including", insert --a--;

Claim 8, Column 51, Line 51:
"encrypts" should be replaced with --the database apparatus reads--;

Claim 10, Column 52, Line 4:
"nicer" should be --user--;

Claim 11, Column 52, Line 45:
"commutation" should be --computation--.